United States Patent
Sadananda et al.

(10) Patent No.: US 7,474,850 B2
(45) Date of Patent: Jan. 6, 2009

(54) REROUTABLE PROTECTION SCHEMES OF AN OPTICAL NETWORK

(75) Inventors: Santosh K. Sadananda, Mountain View, CA (US); Adisorn Ermongkonchai, Oakland, CA (US)

(73) Assignee: Dynamic Method Enterprises Limited, Hong Kong (HK)

( * ) Notice: Subject to any disclaimer, the term of this patent is extended or adjusted under 35 U.S.C. 154(b) by 604 days.

(21) Appl. No.: 11/060,562

(22) Filed: Feb. 16, 2005

(65) Prior Publication Data

US 2005/0185954 A1 Aug. 25, 2005

Related U.S. Application Data

(63) Continuation-in-part of application No. 10/785,597, filed on Feb. 23, 2004.

(51) Int. Cl.
*H04B 10/00* (2006.01)
*H04J 14/00* (2006.01)

(52) U.S. Cl. ............... 398/2; 398/7; 398/49; 398/57
(58) Field of Classification Search ............ 398/48–50, 398/57, 2, 5, 7
See application file for complete search history.

(56) References Cited

U.S. PATENT DOCUMENTS

| 5,757,526 | A | 5/1998 | Shiragaki et al. |
| 6,266,168 | B1 * | 7/2001 | Denkin et al. ............ 398/5 |
| 6,882,765 | B1 * | 4/2005 | Erickson et al. ............ 385/16 |
| 2001/0038471 | A1 * | 11/2001 | Agrawal et al. ............ 359/110 |
| 2002/0024690 | A1 | 2/2002 | Iwaki et al. |
| 2005/0013532 | A1 | 1/2005 | Heiles et al. |
| 2005/0025481 | A1 * | 2/2005 | Fukashiro et al. ............ 398/45 |

FOREIGN PATENT DOCUMENTS

| EP | 1 003 300 A2 | 5/2000 |
| WO | WO 03/073652 A1 | 9/2003 |
| WO | PCT/US2005/005397 | 6/2005 |
| WO | PCT/US2005/005397 | 8/2006 |

OTHER PUBLICATIONS

Rajiv Ramaswami et al., "Optical Networks, A Practical Perspecitve" 2nd Ed., Morgan Kaufmann Pub., ISBN 1-55860-655-6, San Francisco, CA, USA (831 pgs) 2002.
Optical safety procedures and requirements for optical transport systems. ITU-T Recommendation 6.664 [online]. International Telecommunication Union, Mar. 2003 [retrieved on Jan. 18, 2007]. Retrieved from the Internet: <URL: http:http://itu.int/rec/T-REC-G.664/en>.

* cited by examiner

*Primary Examiner*—Jason Chan
*Assistant Examiner*—Nathan M Curs
(74) *Attorney, Agent, or Firm*—Blakely, Sokoloff, Taylor & Zafman LLP

(57) ABSTRACT

Reroutable protection schemes of an optical network are described herein. In one embodiment, an access node detects that at least a portion of a first path of an optical circuit fails based on a loss of a light of the at least a portion of the first path. In response to the detection, the access node provisions a second path leading to a destination node of the first path without waiting for an update of a routing database regarding the failure of the first path, where the second path satisfies a set of disjointness requirements with respect to the first path. Other methods and apparatuses are also described.

28 Claims, 15 Drawing Sheets

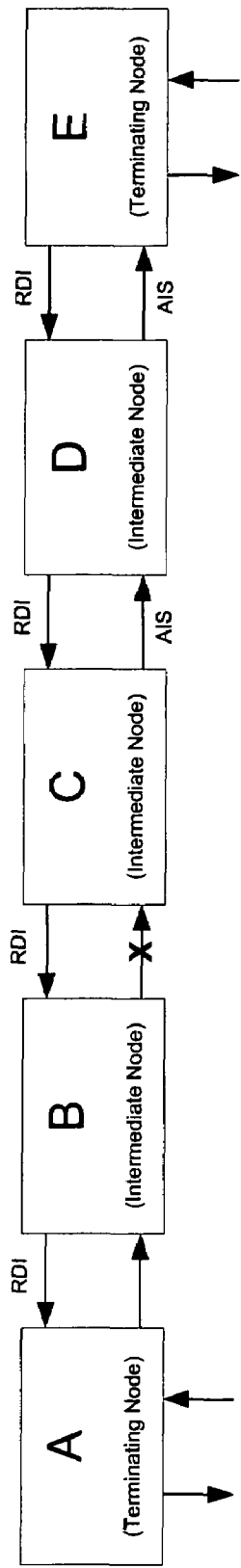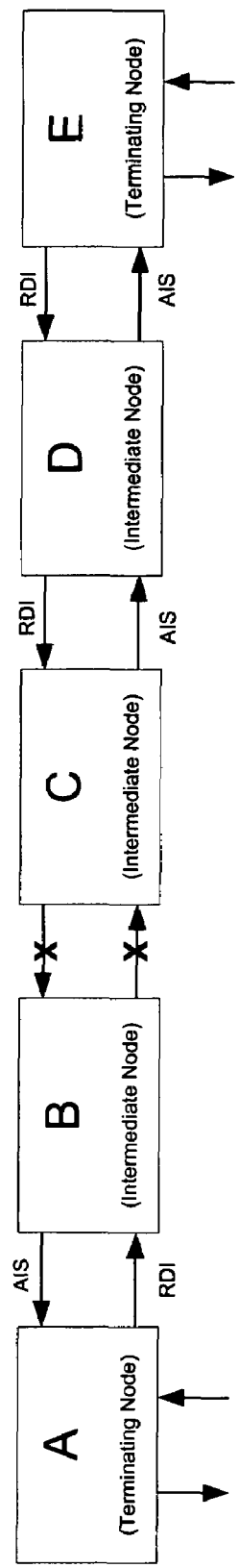
Fig. 1A
(Prior Art)
Fig. 1B
(Prior Art)

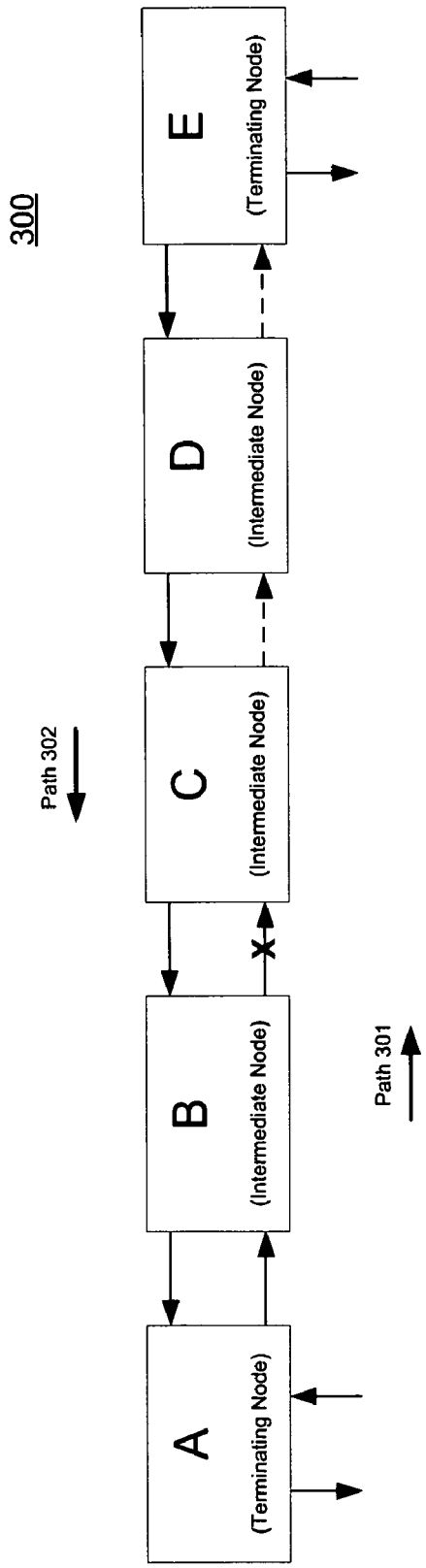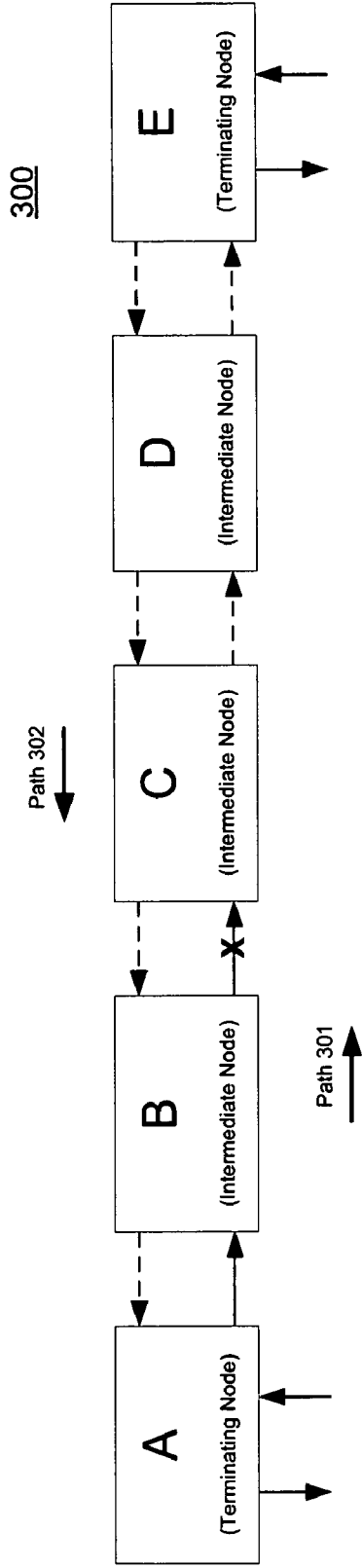

REROUTABLE PROTECTION SCHEMES OF AN OPTICAL NETWORK

This application is a continuation-in-part (CIP) of co-pending U.S. patent application Ser. No. 10/785,597, filed Feb. 23, 2004. The above-identified application is hereby incorporated by reference in its entirety.

FIELD OF THE INVENTION

The present invention relates generally to the field of networking. More particularly, this invention relates to protection schemes of optical networking.

BACKGROUND OF THE INVENTION

An optical network has long enjoyed the sub-60 ms self-healing ring architecture. As the network grows, the ring topology is no longer suitable of its cumbersome provisioning and complex ring inter-working in a large network. The optical mesh network helps solve some of these issues. However, it suffers from a historically slow fault recovery time. The ring network is able to achieve sub-60 ms protection time because the fault detection and protection switching are performed locally where the fault occurred. In a mesh network, the fault recovery procedure is executed at the source and destination for end-to-end path protection. As a result, the fault notification time has contributed to slow recovery time for a mesh network.

Most optical transport networks today are based on electronic switching equipment which takes light as an input and converts the light into electronic data. It then processes the electronic data and converts them back to light. In order to carry the data, different types of framing protocol have been developed, such as, SONET (synchronous optical network), SDH (synchronous digital hierarchy), and OTN (optical transport network). The framing protocol uses a relatively small amount of bandwidth for its overhead data to carry framing information, error checking and monitoring, fault notification, and etc. For example, SONET AIS/RDI (alarm indication signal/remote defect indication) protocols may be used to notify terminating nodes of an optical circuit of the fault condition in the network.

An optical network is a collection of optical network devices interconnected by links made up of optical fibers. Thus, an optical network is a network in which the physical layer technology is fiber-optic cable. Cable trunks are interconnected with optical cross-connects (OXCs), and signals are added and dropped at optical add/drop multiplexers (OADMs). The optical network devices that allow traffic to enter and/or exit the optical network are referred to as access nodes; in contrast, any optical network devices that do not are referred to as pass-thru nodes (an optical network need not have any pass-thru nodes). Each optical link interconnects two optical network devices and typically includes an optical fiber to carry traffic in both directions. There may be multiple optical links between two optical network devices.

A given fiber can carry multiple communication channels simultaneously through a technique called wavelength division multiplexing (WDM), which is a form of frequency division multiplexing (FDM). When implementing WDM, each of multiple carrier wavelengths (or, equivalently, frequencies or colors) is used to provide a communication channel. Thus, a single fiber looks like multiple virtual fibers, with each virtual fiber carrying a different data stream. Each of these data streams may be a single data stream, or may be a time division multiplex (TDM) data stream. Each of the wavelengths used for these channels is often referred to as a lambda.

A lightpath is a one-way path in an optical network for which the lambda does not change. For a given lightpath, the optical nodes at which its path begins and ends are respectively called the source node and the destination node; the nodes (if any) on the lightpath in-between the source and destination nodes are called intermediate nodes. An optical circuit is a bi-directional, end-to-end (between the access nodes providing the ingress to and egress from the optical network for the traffic carried by that optical circuit) path through the optical network. Each of the two directions of an optical circuit is made up of one or more lightpaths. Specifically, when a given direction of the end-to-end path of an optical circuit will use a single wavelength, then a single end-to-end lightpath is provisioned for that direction (the source and destination nodes of that lightpath are access nodes of the optical network and are the same as the end nodes of the optical circuit). However, in the case where a single wavelength for a given direction will not be used, wavelength conversion is necessary and two or more lightpaths are provisioned for that direction of the end-to-end path of the optical circuit. Thus, a lightpath comprises a lambda and a path (the series of optical nodes (and, of course, the interconnecting links) through which traffic is carried with that lambda).

FIGS. 1A and 1B are block diagrams illustrating an optical circuit of a typical SONET/SDH based optical network. In the SONET/SDH world, AIS/RDI signals are generated by the first node that detects a failure of loss of signal (LOS) (e.g., a loss of an electrical signal) in order to suppress the alarms. Both AIS and RDI may be used as triggers to initiate a protection switch action. Note that because the SONET based network assumes that the signal is fully regenerated at each node, only one node would ever detect a LOS on its ingress. On the egress of that node, it would still send a framed SONET signal that contained null data with alarm information in its overhead. Downstream nodes would thus not detect a LOS but would see AIS in the overhead. The downstream node would associate defects related to that signal to the fault reported by an upstream node.

Referring to FIG. 1A, where there is a unidirectional path failure, the intermediate node C is the first node to detect such a failure. Since each of the nodes in the SONET/SDH based network regenerates signals at its respective egress. The downstream of the path (e.g., nodes D and E) still receive optical signals. Typically, in response to the detection, intermediate node C sends AIS signals to both downstream nodes to notify the fault conditions. The terminating node (e.g., node E) may return an RDI signal to its upstream nodes (e.g., nodes A-D) of the optical circuit.

In a case of bi-directional path failures, as shown in FIG. 1B, both nodes B and C send AIS signals to their respective downstream adjacent nodes (e.g., nodes D and A) for the notification purposes. The downstream nodes that receive such notification signals may rebroadcast the notification messages (e.g., an AIS signal) to its respective adjacent downstream nodes.

As a result, each of the intermediate nodes may be required to receive such notification messages, convert the optical notification messages into electrical signals, and regenerate another notification message to its adjacent nodes.

Photonic switching equipment (e.g., equipment that does not typically perform optical to electrical conversion of switching, with exception of adding and dropping traffic) used in all-optical networks, although not widely deployed yet, it is typically based on the GMPLS architecture. The GMPLS architecture also uses signaling protocols, such as RSVP-TE, to perform hop-by-hop data path establishment, removing, and fault notification. When a fault on a data path is detected, a fault notification message is sent hop-by-hop to the source and destination nodes. Such a notification relies on the transmission speed of the signaling channel which is typically 10/100 Mbps.

Such notification messages (e.g., AIS/RDI or RSVP-TE) may be queued during the transmission (e.g., particularly, during the signal conversions between the electrical domain and the optical domain). As the optical network grows, particularly, in a mesh optical network, such notification messages are getting larger and larger which put a heavy burden on the network traffic. As a result, the fault notification may be delayed significantly. Furthermore, in a typical network element, an alternative route may not be established until a routing database is updated, which may take relatively longer time.

SUMMARY OF THE INVENTION

Reroutable protection schemes of an optical network are described herein. In one embodiment, an access node detects that at least a portion of a first path of an optical circuit fails based on a loss of a light of the at least a portion of the first path. In response to the detection, the access node provisions a second path leading to a destination node of the first path without waiting for an update of a routing database regarding the failure of the first path, where the second path satisfies a set of disjointness requirements with respect to the first path. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 1A and 1B are block diagrams illustrating a typical SONET/SDH based fault notification of an optical network.

FIGS. 3A and 3B are block diagrams illustrating an example of a wavelength division multiplex optical circuit according to another embodiment of the invention.

DETAILED DESCRIPTION

Figure 2A:
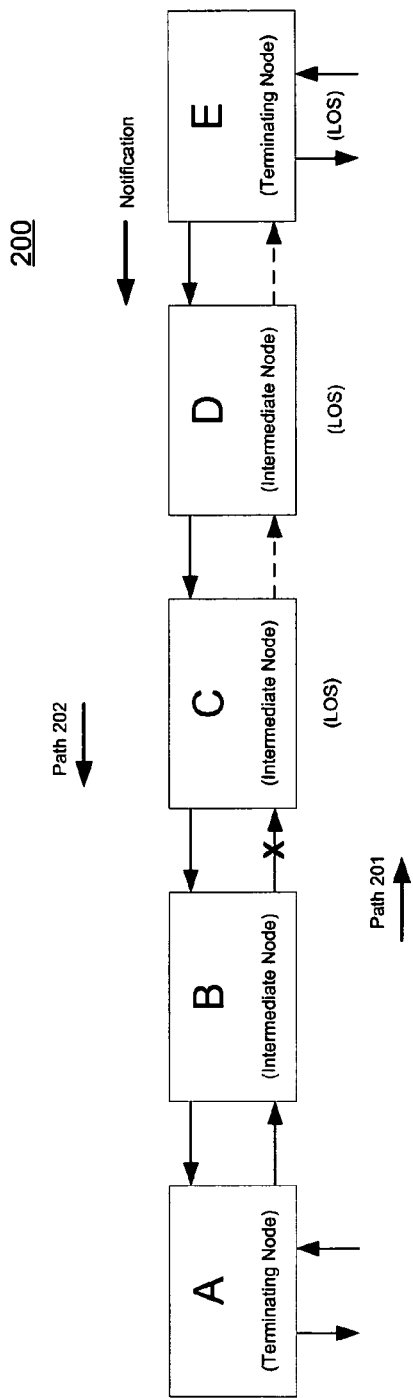
FIGS. 2A and 2B are block diagrams illustrating an example of a wavelength division multiplex optical circuit according to one embodiment of the invention.

Reroutable protection schemes of an optical network are described herein. In one embodiment, instead of using a signal at each node receiving the fault notification that requires a conversion between an optical domain and an electrical domain (e.g., AIS/RDI or RSVP-TE) to detect a failure as in a conventional approach, the presence or absence of light corresponding to a wavelength of a path (path/wavelength), also referred to as a channel or a lambda, is used as an indication whether the respective path/wavelength is down or broken, to notify the terminating nodes of the path/wavelength of the optical circuit (e.g., the source and the destination nodes).

In response the detection, a source node of the optical circuit allocates another path (e.g., an unallocated path) that satisfies a set of disjointness requirement of the failed path without waiting for the routable database to be updated. In one embodiment, the allocated path is a reroutable path that satisfies a predetermined set of disjointness constraints or requirements with respect to the failed path. A reroutable path is a path that is provisioned at real time in response to a path failure. Such real-time provisioning of optical circuits allows for a redundancy (protection) scheme referred to herein as optical reroutable.

In the following description, numerous specific details are set forth (e.g., such as logic resource partitioning/sharing/duplication implementations, types and interrelationships of system components, and logic partitioning/integration choices). However, it is understood that embodiments of the invention may be practiced without these specific details. In other instances, well-known circuits, software instruction sequences, structures and techniques have not been shown in detail in order not to obscure the understanding of this description.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct contact with each other (e.g., physically, electrically, optically, etc.). "Coupled" may mean that two or more elements are in direct contact (physically, electrically, optically, etc.). However, "coupled" may also mean that two or more elements are not in direct contact with each other, but yet still co-operate or interact with each other.

Figure 2B:
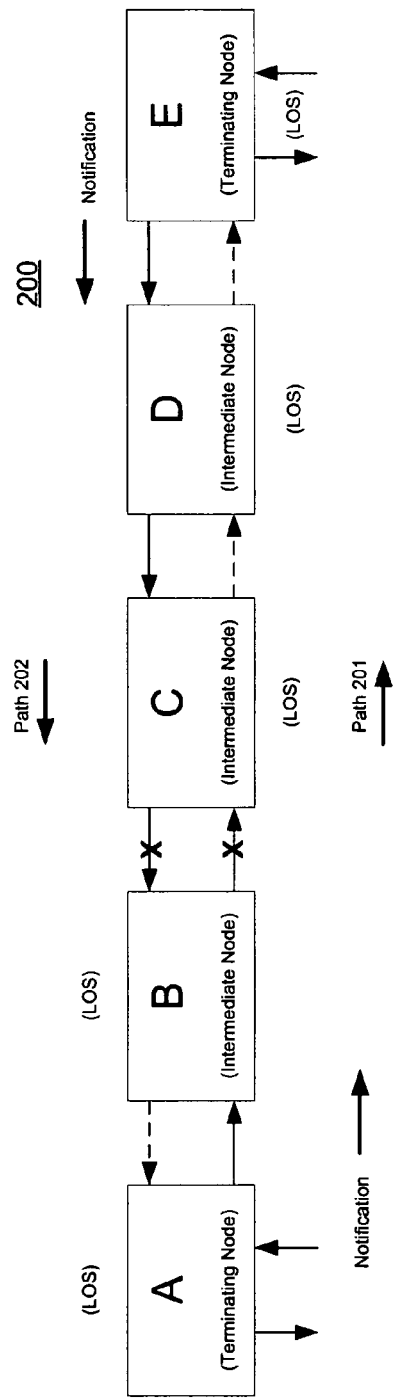

FIGS. 2A and 2B are block diagram illustrating an exemplary fault notification in an all-optical network according to one embodiment of the invention. In contrast to the SONET/SDH based optical network, AIS/RDI mechanisms may not be applied in a straightforward fashion to optically transparent networks. For example, if a fiber is cut, every downstream node will detect loss of signal (LOS) (e.g., loss of optical signals or loss of light). According to one embodiment of the invention, only terminating nodes generate AIS or RDI type signals.

Referring to FIGS. 2A and 2B, according to one embodiment, the exemplary optical circuit includes a unidirectional path 201 from terminating node A to terminating node E and unidirectional path 202 from terminating node E to terminating node A. Between terminating nodes A and E, there may be zero or more intermediate nodes, such as, for example, intermediate nodes B, C, and D. Paths 201 and 202 may be physically implemented within a single fiber with opposite directions. Alternatively, paths 201 and 202 may include multiple optical fibers. Each of the paths 201 and 202 may include multiple wavelengths, also referred to as channels or lambdas. For example, in a typical WDM (wavelength division multiplexing) network, each fiber may include up to 40 wavelengths. Alternatively, there may be up to 80 wavelengths in a DWDM (dense WDM) network. It will be appreciated that more or less wavelengths may be implemented within a fiber or a path. Terminating nodes A and E may be a source or a destination node of the optical circuit.

Referring to FIG. 2A, where there is a unidirectional path failure, exemplary optical circuit 200, as an example, includes terminating nodes A and E (also referred to as end nodes) and zero or more intermediate nodes B, C, and D in between. The exemplary optical circuit 200 may be a part of an optical ring network or an optical mesh network. It will be appreciated that more, less, or no intermediate nodes may be implemented between the terminating nodes A and E. In one embodiment, exemplary optical circuit 200 includes a unidirectional path 201 from terminating node A to terminating node E and a unidirectional path 202 from terminating node E to terminating node A. Paths 201 and 202 may be implemented within a single fiber. Alternatively, paths 201 and 202 may be implemented within different fibers. Terminating nodes A and E may be a source or a destination node of the optical circuit. The intermediate nodes B, C, and D may or may not be access nodes.

The unidirectional paths 201 and 202 may be established using a variety of techniques apparent to those with ordinary skill in the art. According to one embodiment, the unidirectional paths 201 and 202 may be established and provisioned based on a service level topology associated with the respective path or paths. Further detailed information concerning establishments and provisioning of the paths may be found in a co-pending U.S. patent application Ser. No. 10/754,931, filed Jan. 9, 2004, entitled "A Method and Apparatus for a Network Database in an Optical Network", and assigned to a common assignee of the present application. The above-identified U.S. patent application is hereby incorporated by reference.

For illustration purposes, it is assumed that terminating node A is a source node of the optical circuit while terminating node E is a destination node of the optical circuit. In this example, path 201 may be referred to as a transmission path while path 202 may be referred to as a return path corresponding to the transmission path. When a failure occurs between the path from node B to node C, all downstream nodes (e.g., nodes C, D, and E) will detect LOS, where absence of signal is depicted as a dotted line. The failure may be resulted from a fiber failure, such as, for example, a fiber cut between nodes B and C. Alternatively, the failure may be resulted as a wavelength (e.g., a channel or a lambda) failure within the path, such as, for example, the malfunctioning laser device corresponding to that wavelength.

According to one embodiment, unlike the conventional approaches, where each intermediate node (e.g., nodes C and D) may be required to send a notification message (e.g., AIS/RDI or RSVP-TE protocols) to notify its respective adjacent nodes, only the terminating node E will respond to the LOS and generate a notification signal via path 202 to notify the opposite terminating node A, while the intermediate nodes (e.g., nodes B, C, and D) do not send notification messages in response to the detection of LOS.

In a case of bi-directional failure, as shown in FIG. 2B, the failures between nodes B and C are detected by the terminating nodes A and E because of LOS detected at the terminating nodes. Similar to the example of unidirectional failure illustrated in FIG. 2A, the intermediate nodes B, C, and D would not send any notification messages in response to the detected LOS. As a result, the detection and notification of the failures have been greatly improved.

FIGS. 3A and 3B are block diagram illustrating an example of a fault notification in an optical circuit of an all-optical network according to another embodiment of the invention. In one embodiment, exemplary optical circuit 300 includes multiple access nodes interconnected via one or more links. Each of the access nodes detects at a node, which may or may not be an access node, that at least a portion of a first unidirectional path of an optical circuit is down, the first unidirectional path being originated from a first terminating node, and signals the first terminating node by removing at least a portion of light of a second unidirectional path in an opposite direction of the first unidirectional path of the optical circuit, to indicate a path between the node and the first terminating node is down.

Referring to FIG. 3A, according to one embodiment, the exemplary optical circuit includes a unidirectional path 301 from terminating node A to terminating node E and unidirectional path 302 from terminating node E to terminating node A. Between terminating nodes A and E, there may be zero or more intermediate nodes, such as, for example, intermediate nodes B, C, and D. Paths 301 and 302 may be physically implemented within a single fiber with opposite directions. Alternatively, paths 301 and 302 may include multiple optical fibers. Each of the paths 301 and 302 may include multiple wavelengths, also referred to as channels or lambdas. For example, in a typical WDM (wavelength division multiplexing) network, each fiber may include up to 40 wavelengths. Alternatively, there may be up to 80 wavelengths in a DWDM (dense WDM) network. It will be appreciated that more or less wavelengths may be implemented within a fiber or a path. Terminating nodes A and E may be a source or a destination node of the optical circuit. The intermediate nodes B, C, and D may or may not be access nodes.

The unidirectional paths 301 and 302 may be established using a variety of techniques apparent to those with ordinary skill in the art. According to one embodiment, the unidirectional paths 301 and 302 may be established and provisioned based on a service level topology associated the respective path or paths, such as those illustrated in the above-identified incorporated co-pending patent application.

For illustration purposes, it is assumed that terminating node A is a source node of the optical circuit while terminating node E is a destination node of the optical circuit. In this example, path 301 may be referred to as a transmission path while path 302 may be referred to as a return path corresponding to the transmission path. When a failure occurs between the path from node B to node C, all downstream nodes (e.g., nodes C, D, and E) will detect a LOS (e.g., loss of light), where absence of signal is depicted as a dotted line. The failure may be resulted from a fiber failure, such as, for example, a fiber cut between nodes B and C. Alternatively, the failure may be resulted as a wavelength (e.g., a channel or a lambda) failure within the path, such as, for example, the malfunctioning laser device corresponding to that wavelength.

According to one embodiment, unlike the conventional approaches, where each intermediate node (e.g., nodes C and D) may be required to send a notification message (e.g., AIS/RDI or RSVP-TE protocols) to notify its respective adjacent nodes, only the terminating node E will respond to the LOS and remove at least a portion of the light of path 302 to notify the opposite terminating node A, while the intermediate nodes (e.g., nodes B, C, and D) do not send perform any notification in response to the detection of LOS. Unlike the embodiments illustrated in FIGS. 2A and 2B, the terminating node E, in this case, a destination node, turns off the light of the corresponding return path (e.g., path 302 as depicted as dotted lines shown in FIG. 3B) as a signal to notify the opposite terminating node A that at least a portion of path 301 or path 302 is down. In one embodiment, the light may be turned off by turning off the corresponding laser(s) or alternatively, by removing the corresponding photonic cross connect(s) associated with the path(s). Terminating node A, in this case, a source node, may be notified by not receiving an optical signal (e.g., light) of path 302. As a result, terminating node E does not have to convert the optical signal into an electrical signal to generate a notification signal, such as an AIS/RDI or RSVP-TE signal, to notify terminating node A.

Figure 4A:
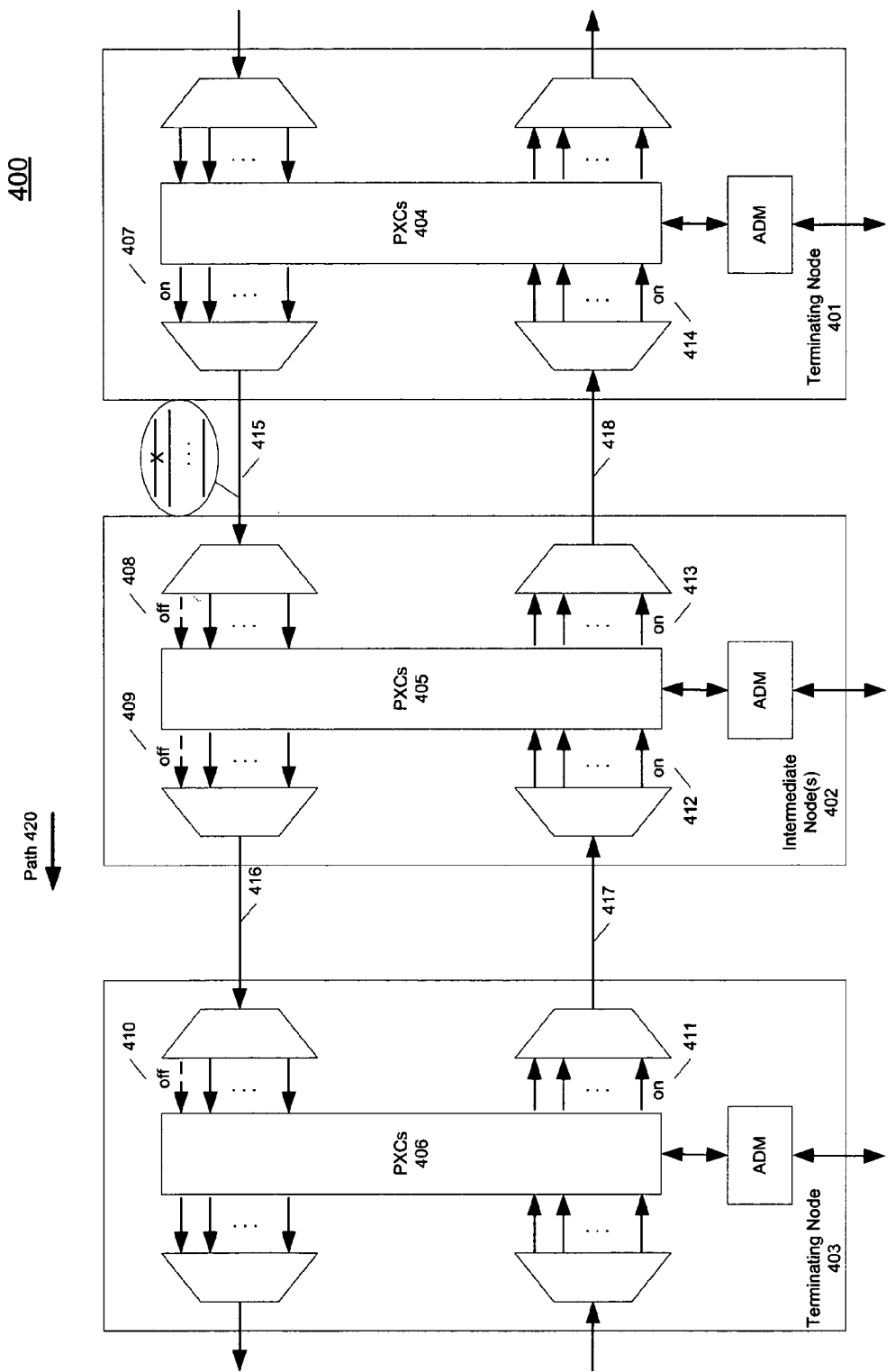
FIGS. 4A and 4B are block diagrams illustrating an example of a wavelength division multiplex optical circuit according to another embodiment of the invention.
Figure 4B:
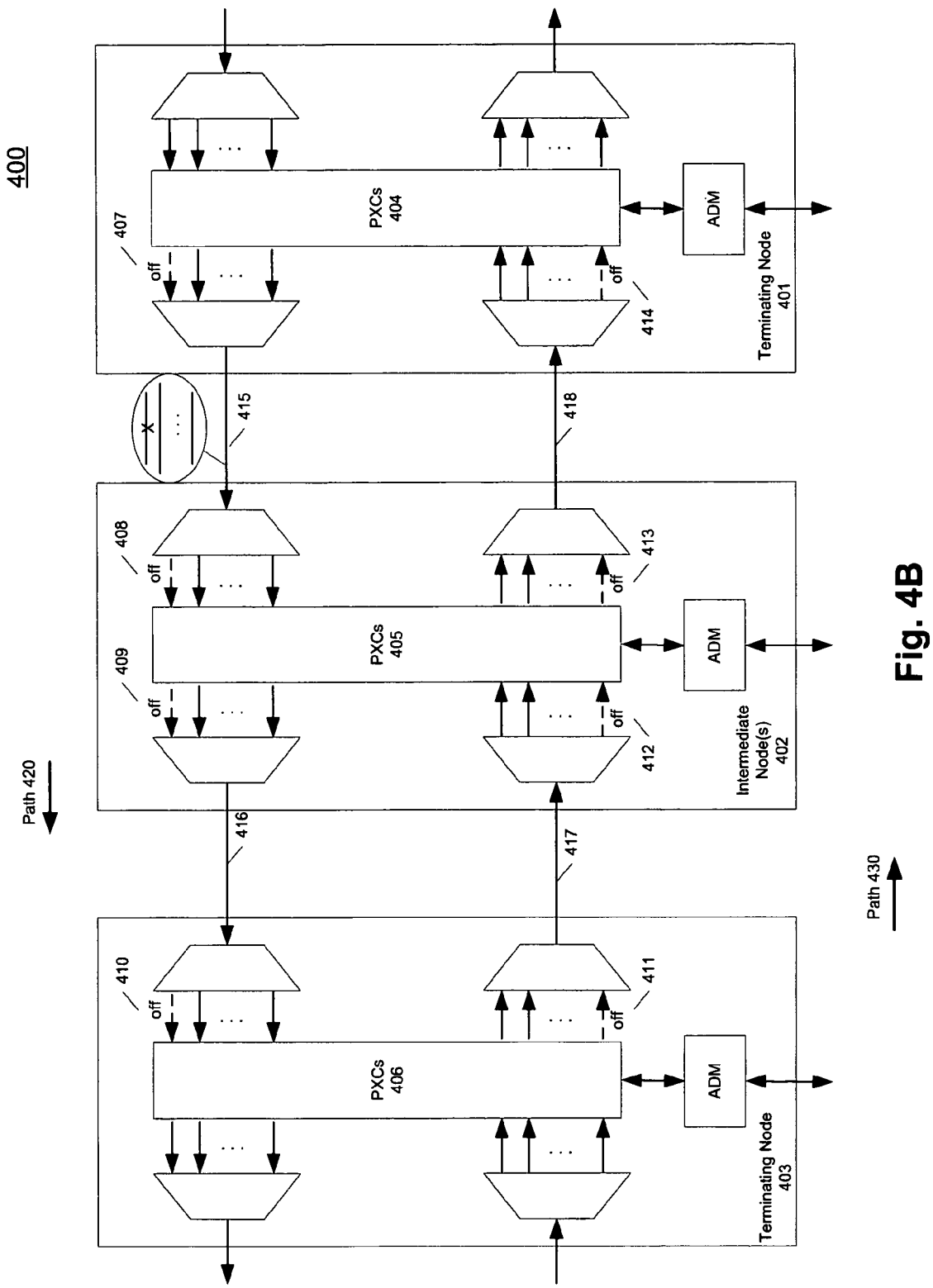

FIGS. 4A and 4B are block diagrams illustrating an example of a fault notification in an optical circuit of an all-optical network according to another embodiment of the invention. The exemplary optical circuit may be viewed as a detailed aspect of the embodiments shown in FIGS. 3A and 3B. According to one embodiment, in response to the detection of the LOS of a wavelength of a unidirectional path (e.g., path/wavelength), each of the downstream nodes checks whether the respective node is a terminating node of the optical circuit, such as, for example, a destination node of the optical circuit. If it is determined that the respective node is a terminating node of the optical circuit, the terminating node removes the light of a wavelength in an opposite direction with respect to the failed wavelength. In one embodiment, the light of the wavelength in the opposite direction may be removed by turning off the corresponding laser associated with the wavelength. Alternatively, the light may be removed by removing the corresponding photonic cross connect associated with the wavelength. As a result, the other terminating node at the other end of the optical circuit (e.g., the source node) will receive no light of that wavelength as an indication of a failed wavelength within the optical circuit.

Referring to FIG. 4A, in one embodiment, exemplary optical circuit 400 includes terminating nodes 401 and 403, and zero or more intermediate nodes 402. The terminating nodes 401 and 403 may be a source node or a destination node of the optical circuit. Each of the nodes 401-403 includes one or more photonic cross connects (PXCs) (e.g., PXCs 404-406) for switching traffic from the respective ingress port to an egress port. The nodes 401-403 of the optical circuit 400 are interconnected via one or more links. Each of the links may include one or more fibers and each fiber may include one or more wavelengths (also referred to as channels or lambdas), such as, for example, 40 wavelengths in a WDM network or 80 wavelengths in a DWDM network.

In this embodiment, for illustration purposes, it is assumed that terminating node 401 is a source node of the optical circuit 400 while terminating node 403 is a destination node of the optical circuit. Unidirectional path 420 from terminating node 401 to terminating node 403 may include one or more fibers 415 and 416. Unidirectional path 430 from terminating node 403 to terminating node 401 may include one or more fibers 417 and 418. Fibers 415-418 may be the same fiber having opposite unidirectional paths 420 and 430. Alternatively, fibers 415-418 may be different fibers. The one or more intermediate nodes 402 may or may not be access nodes.

In this example, path 420 may be referred to as a transmission path while path 430 may be referred to as a return path corresponding to the transmission path. When a failure of a wavelength of path 420 occurs between terminating node 401 and intermediate node 402, such as, for example, a wavelength of fiber 415 of path 420 is down as illustrated in the balloon), all downstream nodes (e.g., terminating node 403 and any of the intermediate nodes between the failure and that terminating node) will detect a LOS (e.g., loss of light), where absence of signal is depicted as a dotted line. The failure may be resulted from a wavelength (e.g., a channel or a lambda) failure within the path, such as, for example, the malfunctioning laser device corresponding to that wavelength.

In this example, the failed wavelength of path 420 (e.g., path/wavelength) is represented by wavelengths 407 to 410 across every nodes of the path 420. As a result of a failed wavelength of fiber 415, downstream nodes 403 and 402 will detect the LOS on wavelengths 408-410, as depicted as dotted lines. According to one embodiment, in response to the detection of LOS, each of the downstream nodes (e.g., terminating node 403 and zero or more intermediate nodes 402) checks whether the respective node is a terminating node of the optical circuit. If so, the terminating node will turn off the light of the corresponding wavelength of the unidirectional return path of the optical circuit.

In this example, since the one or more intermediate nodes 402 are not the terminating nodes of the optical circuit 400, the one or more intermediate nodes 402 will not performing signaling the terminating nodes of the optical circuit. However, when terminating node 403 detects the LOS, the terminating node 403 turns off the light of the corresponding wavelength (represented by wavelengths 411-414) of the unidirectional return path 430, as illustrated in FIG. 4B. As a result, terminating node 401 receives no light on the corresponding wavelength 414 of path 430. Since no notification messages or protocols are involved in this embodiment, there is no need to convert the optical signals to electrical signals in order to notify a terminating node concerning the failures of a wavelength of a path. As a result, a terminating node is notified in a much quicker manner. In one embodiment, the light of the wavelength in the opposite direction may be removed by turning off the corresponding laser associated with the wavelength. Alternatively, the light may be removed by removing the corresponding photonic cross connect associated with the wavelength. Other methods for removing at least a portion of light may be utilized within the scope of the embodiments of the invention.

Figure 5A:
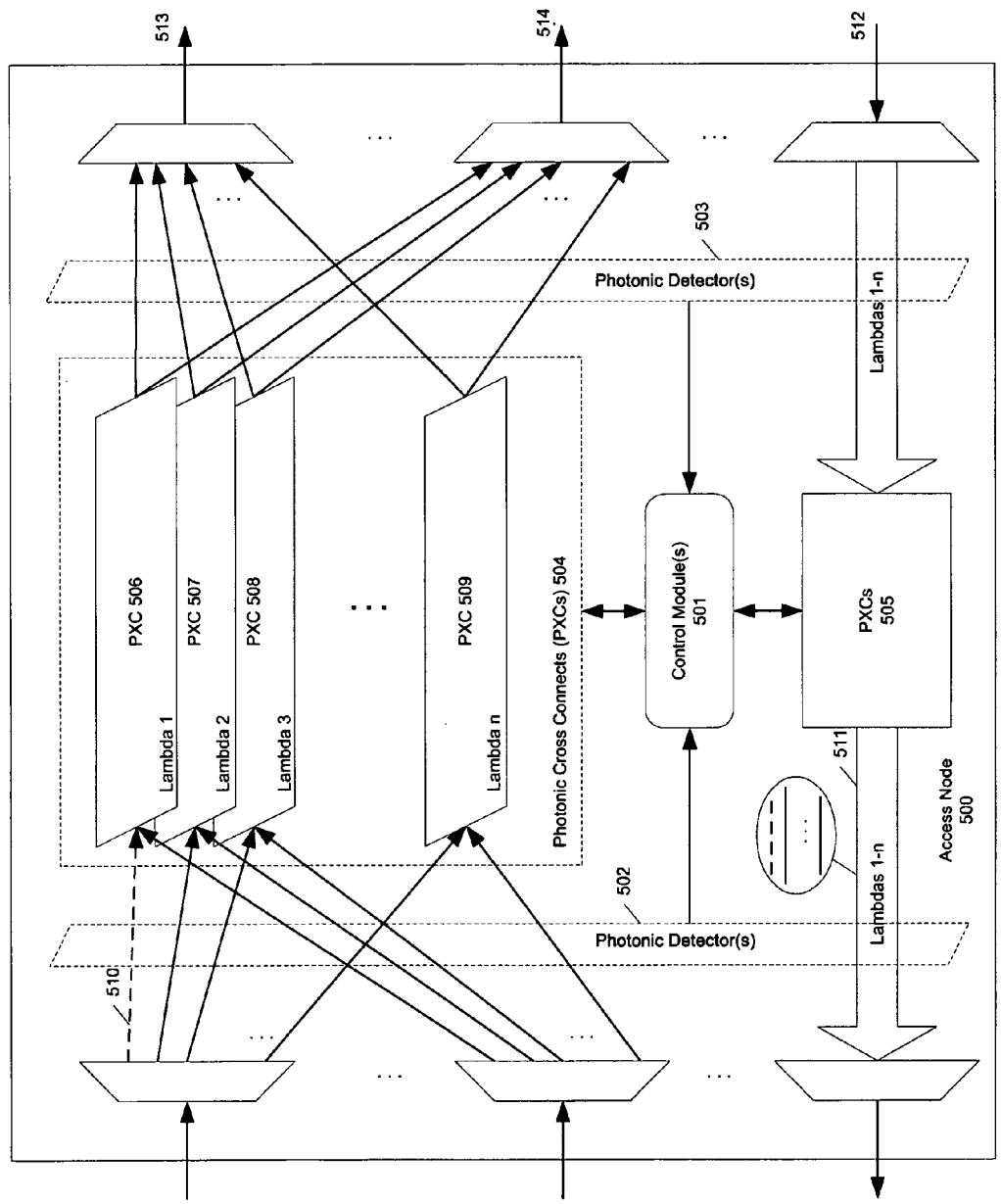
FIGS. 5A and 5B are block diagrams illustrating an example of an access node of a wavelength division multiplex optical network according to certain embodiments of the invention.

FIG. 5A is a block diagram illustrating an example of an access node of an all-optical network according to one embodiment of the invention. In one embodiment, exemplary access node 500 includes, but not limited to, a detection module to detect that at least a portion of a first unidirectional path of an optical circuit is down, the first unidirectional path being originated from a first terminating node, and a control module coupled to the detection module to signal the first terminating node by terminating at least a portion of light of a second unidirectional path in an opposite direction of the first unidirectional path of the optical circuit, to indicate that the first unidirectional path is down.

Referring to FIG. 5A, according to one embodiment, exemplary access node 500 includes one or more photonic cross connects (PXCs) 504 and 505 to provide cross connect services for the unidirectional or bi-directional traffic. Each of the PXCs includes one or more individual PXCs (e.g., PXCs 506-509) to handle cross connect services for each wavelength (e.g., lambda or channel). In addition, according to one embodiment, exemplary access node includes a control module 501 coupled to the PXCs 504 and 505, and one or more photonic detectors 502 and 503. The PXCs 504 and 505 may be the same PXCs for handling bi-directional traffic. In addition, the exemplary access node 500 includes one or more add/drop multiplexers (ADMs) (not shown) to allow traffic get on or off the respective optical circuit.

According to one embodiment, photonic detectors 502 and 503 may be used to detect whether there is a LOS on a wavelength. The detection may be performed on a wavelength basis. In one embodiment, the photonic detectors 502 and 503 may be photo diodes that can detect presence or absence of the light on a per wavelength basis. When a LOS of a wavelength is detected by the photonic detector, the photonic detector notifies the control module. According to one embodiment, the control module determines whether the access node is a terminating node of an optical circuit. If the access node is determined to be a terminating node of an optical circuit, the control module instructs a PXC to turn off a light of a wavelength in an opposite direction of the failed wavelength to notify the other terminating node of the optical circuit failure. Alternatively, the control module may alter the PXC or switch off the laser, etc. for the purposes of signaling.

For example, for illustration purposes, it is assumed that wavelength 510 is down or broken (e.g., a loss of light) as illustrated by a dotted line. As a result, a LOS detected by photonic detector 502. In response to the detection, photonic detector 502 notifies control module 501 regarding the status of wavelength 510. Control module 501 determines whether access node 500 is a terminating node of the optical circuit corresponding to the path/wavelength 510. If control module 501 determines that access node 500 is a terminating node of the optical circuit, control module 501 instructs PXCs 505 to turn off the light of the corresponding wavelength of a path in an opposite direction of the paths controlled by PXCs 504, as illustrated by a dotted line of the balloon of path 511. If control module 501 determines that access node 500 is not a terminating node of the optical circuit, control module 501 may simply ignore the detection with respect to the signaling the terminating nodes of the failure.

Similarly, photonic detector 503 may detect any wavelength of path 512 that has lost light. In return, photonic detector 503 may notify control module 501 regarding the LOS of the wavelength of path 512. If the access node 500 is a terminating node of the corresponding optical circuit, control module 501 may instruct the PXCs 504 to turn off the light of the corresponding wavelength in the opposite direction of path 512, such as, for example, a wavelength in at least one of paths 513 and 514, to notify the other terminating node of the corresponding optical circuit. In this manner, there is no need to convert the optical signals into electrical signals and use the notification packets (e.g., AIS/RDI or RSVP-TE) to notify the other terminating node (e.g., a source node). As a result, the speed of fault notification has been greatly improved. In one embodiment, the light of the wavelength may be removed by turning off the corresponding laser associated with the wavelength. Alternatively, the light may be removed by removing the corresponding photonic cross connect associated with the wavelength.

Figure 5B:
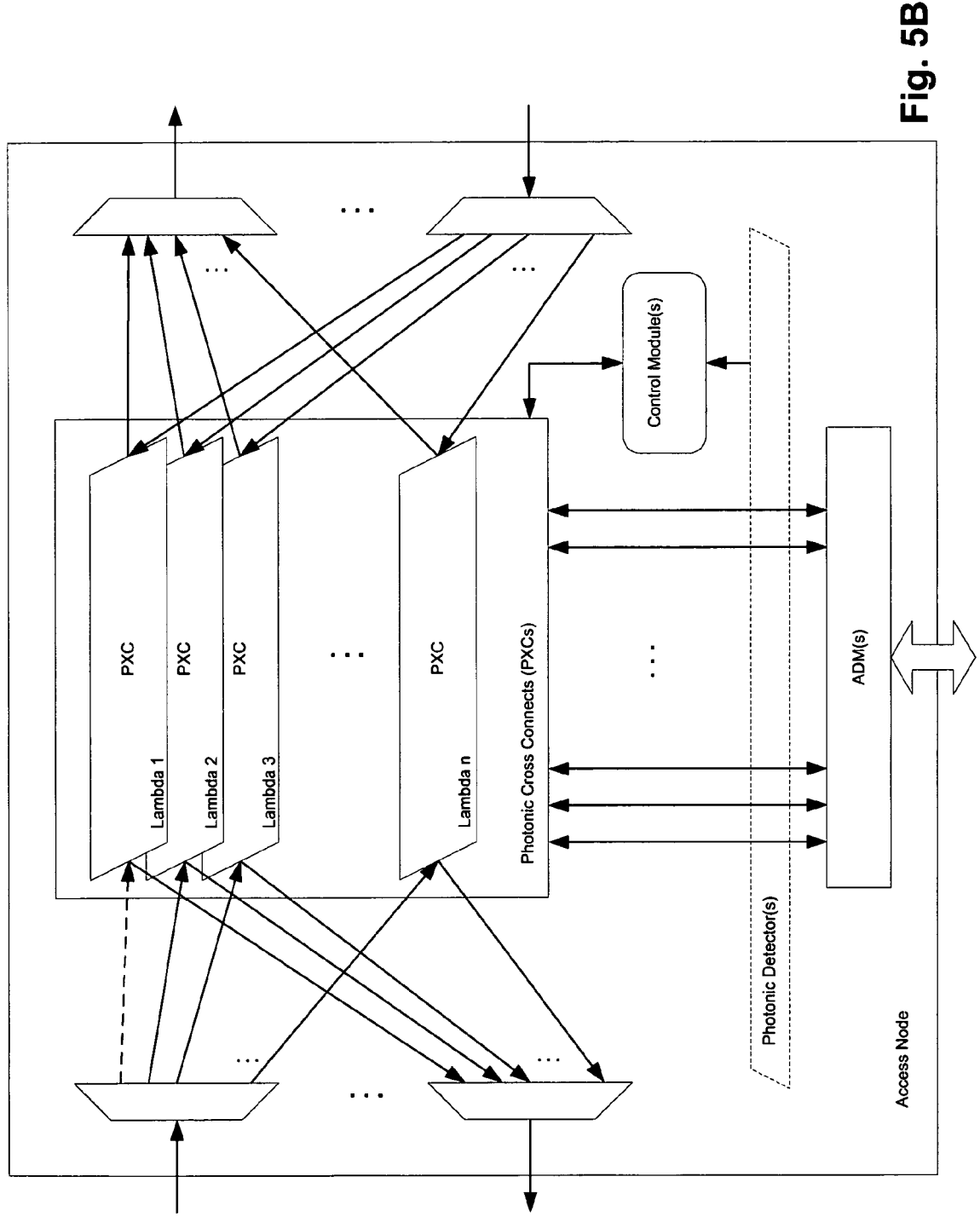

Alternatively, according to another embodiment of the invention, the photonic detector may detect the loss of optical signals (e.g., loss of light) across the connections between the PXCs and the ADM, as shown in FIG. 5B. In this embodiment, the optical signals that are detected by the photonic detector are the optical signals terminated or originated at a terminating node of an optical circuit. That is, the optical signals of a non-terminating node would not be detected by the photonic detector because the optical signals are not terminated or originated at a non-terminating node. Therefore, when the phonotic detector, which is located between the PXC and the ADM, detects a loss of light at one or more path/wavelengths, the corresponding node would most likely a terminating node of the respective optical circuit. As a result, the node may not need to determine whether the corresponding node is a terminating node before responding the detection of the loss of light, because when the control module receives such a detection from the photonic detector, the corresponding node would most likely be a terminating node of the optical circuit. It will be appreciated that other configurations may exist.

Further detailed information concerning the exemplary nodes illustrated in FIGS. 5A and 5B can be found in a co-pending U.S. patent application Ser. No. 10/785,619, entitled "A Method And An Apparatus To Detect Signal Failure On A Per Wavelength Basis", filed Feb. 23, 2004, and assigned to a common assignee of the present application, which is hereby incorporated by reference.

Figure 6:
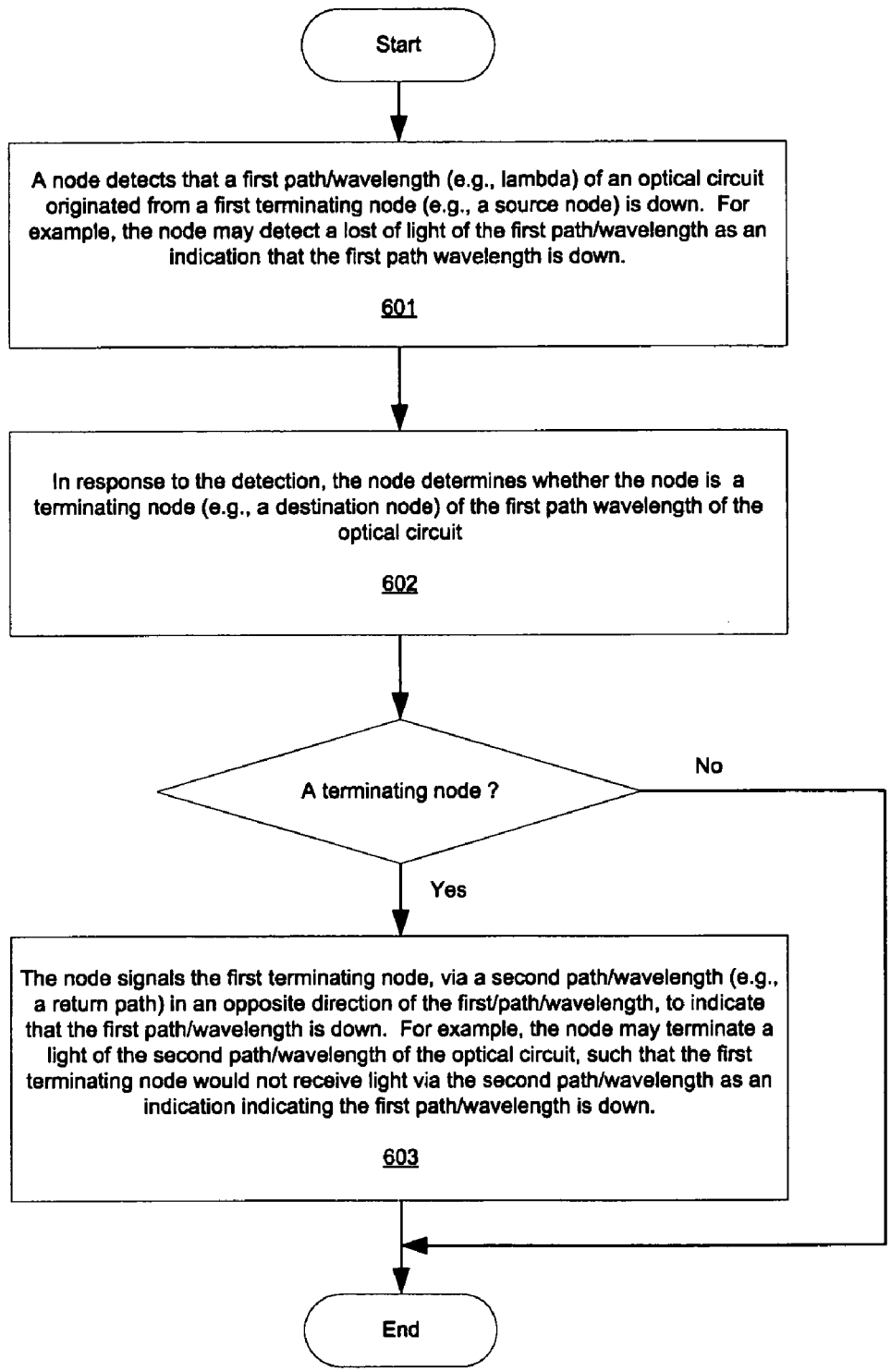
FIG. 6 is a flow diagram illustrating an example of a process for fault notification in a wavelength division multiplex optical network according to one embodiment of the invention.

FIG. 6 is a flow diagram illustrating an example of a process for fault notifications in an optical network according to one embodiment of the invention. Exemplary process 600 may be performed by a processing logic that may comprise hardware (circuitry, dedicated logic, etc.), software (such as is run on a dedicated machine), or a combination of both. In one embodiment, exemplary process 600 includes, but not limited to, detecting at a node that at least a portion of a first unidirectional path of an optical circuit is down, the first unidirectional path being originated from a first terminating node, and signaling the first terminating node by removing at least a portion of light of a second unidirectional path in an opposite direction of the first unidirectional path of the optical circuit, to indicate a path between the node and the first terminating node is down.

Referring to FIG. 6, at block 601, a node detects that at least a portion of a first unidirectional path of an optical circuit is down, where the first unidirectional path is originated from a first terminating node of the optical circuit, such as, for example, a source node. In one embodiment, the detection may be performed based on a per wavelength basis. For example, a node may detect that one or more wavelengths of the path (e.g., path/wavelength) are down. According to one embodiment, the node may detect the failed wavelength by detecting the loss of light of the respective wavelength as an indication of the failed wavelength.

In response to the detection, at block 602, the node determines whether the respective node is a terminating node of the optical circuit, such as, for example, a destination node of the optical circuit. In one embodiment, the determination is performed based on information related to the path containing the failed wavelength, which may be stored in a database maintained by the node. In the embodiment as shown in FIG. 5B, the determination of whether the node is a terminating node may not needed.

If the node is determined to be a terminating node of the optical circuit, at block 603, the node signals the first terminating node via a second wavelength of a path in an opposite direction of the failed path of the optical circuit to indicate the first path/wavelength is down. In one embodiment, the node turns off the light of the second path/wavelength, such that the first terminating node (e.g., the source node) would not receive the light of the second path/wavelength as an indication of the failure of the first path/wavelength. In one embodiment, the light of the second path/wavelength may be removed by turning off the corresponding laser associated with the second path/wavelength. Alternatively, the light may be removed by removing the corresponding photonic cross connect associated with the second path/wavelength. If the node is not a terminating node of the optical circuit (e.g., a destination node of the optical circuit), the node may simply ignore the detection of LOS of the first path/wavelength for the purposes of signaling the terminating nodes of the failure. Other operations apparent to those with ordinary skill in the art may be included.

Figure 7:
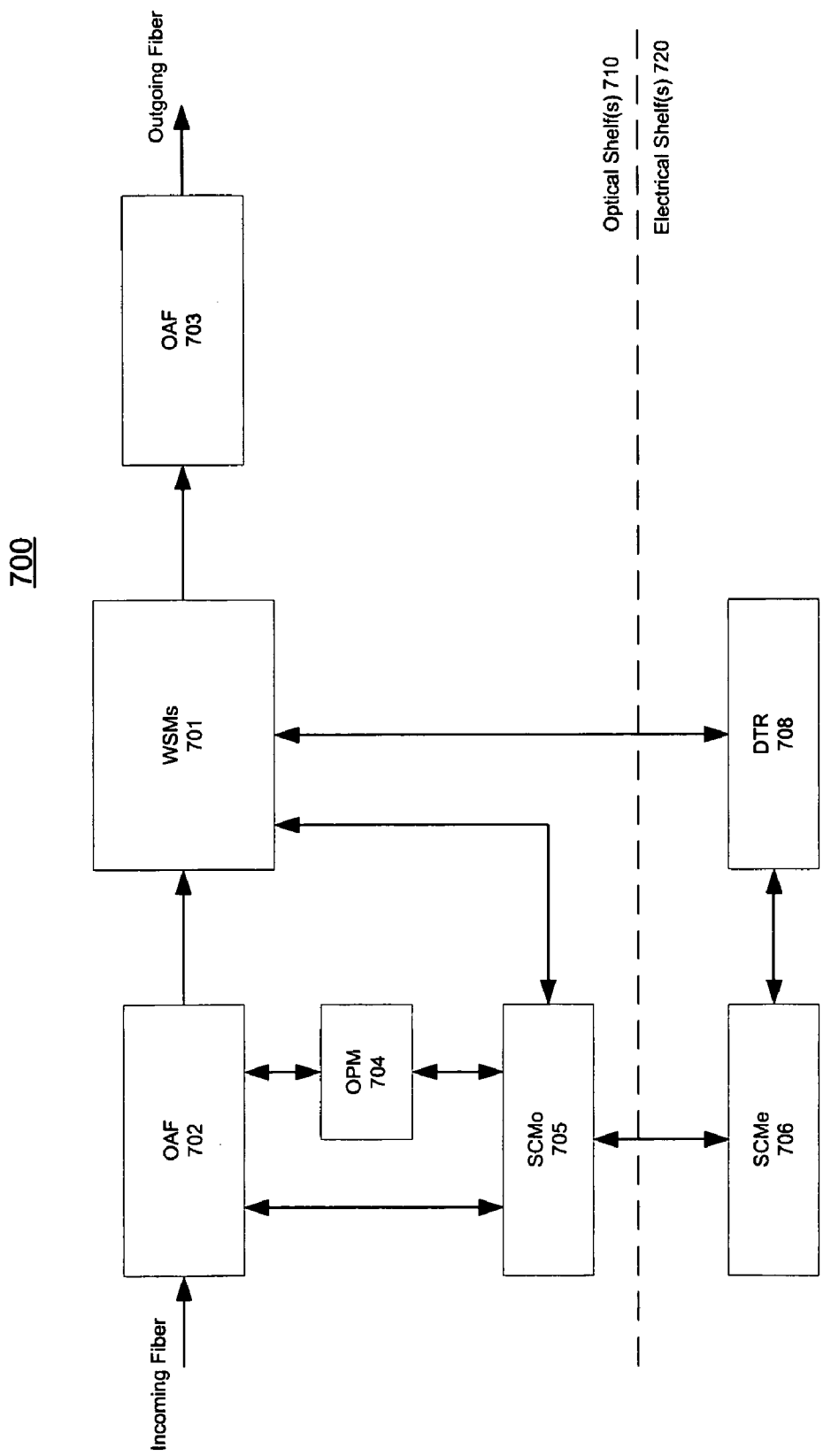
FIG. 7 is a block diagram illustrating an exemplary access node according to one embodiment of the invention.

FIG. 7 is a block diagram illustrating an exemplary access node according to one embodiment of the invention. For example, exemplary access node 700 may be implemented as any of the access nodes shown in FIGS. 2A-2B, 3A-3B, 4A-4B, and 5A-5B. In one embodiment, exemplary access node 700 includes, but is not limited to, one or more wavelength switching modules (WSMs) 701, one or more optical amplification and filtering modules (OAFs) 702-703, an optical performance module (OPM) 704, one or more shelf control modules (SCMs) including an optical SCM (SCMO) 705 and an electrical SCM (SCMe) 706, and one or more DWDM transmitter/receiver (DTRs).

For the purposes of illustration only, the exemplary access node 700 is shown having one direction of traffic. It will be appreciated that the exemplary access node 700 may handle both directions of traffic. For example, both OAFs 702-703 may handle both incoming optical signals and outgoing optical signals. In addition, OPM 704 and SCMs 705-706 may be coupled to OAF 703.

In one embodiment, OAFs 702-703, WSMs 701, OPM 704, and SCMo 705 may be implemented within an optical shelf 710, while SCMe 706 and DTRs 708 may be implemented within an electrical shelf 720. SCMo 705 and SCMe 706 may be implemented as a single module. Other configurations may exist.

According to one embodiment, OAFs 702 and 703 deal with most of the DWDM multiplexing aspects of a particular network fiber. In the incoming direction, OAF 702 pre-amplifies the incoming mulitiplexed DWDM signals and may fix pulse distortion due to chromatic dispersion prior to demultiplexing them down to individual wavelengths (channels). In the outgoing direction, OAF 703 combines the individual channels and may boost the multiplexed DWDM signal prior to sending to the next node. Detailed information concerning an OAF will be described further below.

In one embodiment, WSM 701 implements call set-up and tear down requests. The WSM 701 allows the redirection of "through" signals that are incoming on one network fiber (e.g., incoming from any OAF) to exit on any of one the outgoing network fibers (e.g., sent to any OAF). The WSM 701 also provides the ability to power adjust the optical signals so that they are at the correct power level when they leave the OAF. The WSM 701 also contains optical "taps" that send certain percents (e.g., 5%) of the signal to monitoring devices (e.g., photonic detectors). The purpose of the monitoring devices is to indicate presence or absence of signal for diagnostic or protection switching purposes. Use of these photodetectors for detecting the presence and absence of signals (e.g. Loss of Signal, LOS) will be faster than relying on the OCM/OPM and will be key for us to ensure the fastest recovery optical signals possible.

In one embodiment, OPM 704 is an instrument grade module and may be shared among a number of modules or ports. In one embodiment, OPM 704 is responsible to provide the source and detection mechanisms to participate in LMP processes for discovery and fault isolation, to provide emergency diagnostic capabilities, to provide feedback signal to allow proper VOA (variable optical attenuation) setting, and to gather information relating to health of system.

In one embodiment, SCMo 705 and SCMe 706 each includes a processor and non-volatile storage and is responsible for managing the operation of the optical and electrical shelfs respectively. In one embodiment, DTRs 708 may be a part of an ADM for transmitting and receiving DWDM signals.

According to one embodiment, the lost of signal may be detected in a variety of locations with the exemplary access node 700. The lost of signal may be detected as per fiber basis and/or per wavelength basis in OAFs 702-703. The lost of signal may be detected per wavelength basis within WSMs 701 and DTRs 708. In response to the detection of lost of signals, the exemplary access node 700 may determine whether the exemplary access node 700 is a source node of an optical circuit containing the failed path. If it is determined that the access node is a source node, the access node may allocate an alternative path at real-time (e.g., a reroutable path leading to the same destination) that satisfies a set of disjointness constraints with respect to the failed path. The alternative path may be allocated without waiting for the routing database updated with respect to the failed path of the optical circuit.

In one embodiment, the set of disjointness constraints may include at least one of a node disjoint, a link disjoint, a maximally node disjoint, and a maximally link disjoint, etc. The set of disjointness constraints may be configured according to a priority order specified by a user or owner of the optical circuit (e.g., a preference).

According to one embodiment, exemplary access node 700 may maintain a database that stores available paths from a source node to reachable destinations nodes in a network in which the links between nodes can carry multiple channels. Each of the available paths being a series of nodes and interconnecting links from the source node to one of the reachable destination nodes. In addition, each of the available paths has associated to it in the database a set of one or more of the channels on the interconnecting links available to form path/channel combinations (in a WDM network, these path/channel combinations would be path/wavelength combinations). While embodiments of the invention are not limited to WDM network, the invention will be described with reference to WDM networks for illustrative purposes.

According to one embodiment, a source based scheme is used in which network topology databases, based on a set of connectivity constraints, are kept in access nodes. The reduced network topology database size (as compared to a physical network topology database) and distributed nature of this source based scheme allows for the provisioning of optical circuits in real-time (or on the fly; that is, the demands do not need to know ahead of time). Such real-time provisioning of optical circuits allows for a redundancy (protection) scheme referred to herein as optical reroutable.

In the optical reroutable redundancy scheme, upon learning of a failure affecting an optical circuit, a new optical circuit is provisioned in real time and the traffic moved to it. For example, in certain embodiments of the invention in which the optical network includes optical network nodes that have optical cross-connects, upon learning of a failure affecting a given optical circuit, one end node of that optical circuit (e.g., the one that originally received the demand that caused the provisioning of that optical circuit) causes the provisioning of a new optical circuit in real time and both end nodes move the traffic to it. By way of particular example, in such embodiments of the invention that use a source based scheme and are conversion free, upon learning of a failure affecting a given optical circuit, the end node that originally received the demand causes the provisioning of a path in either direction (where both paths share the same path to the other end node) and both end nodes switch the traffic to these paths.

Figure 8:
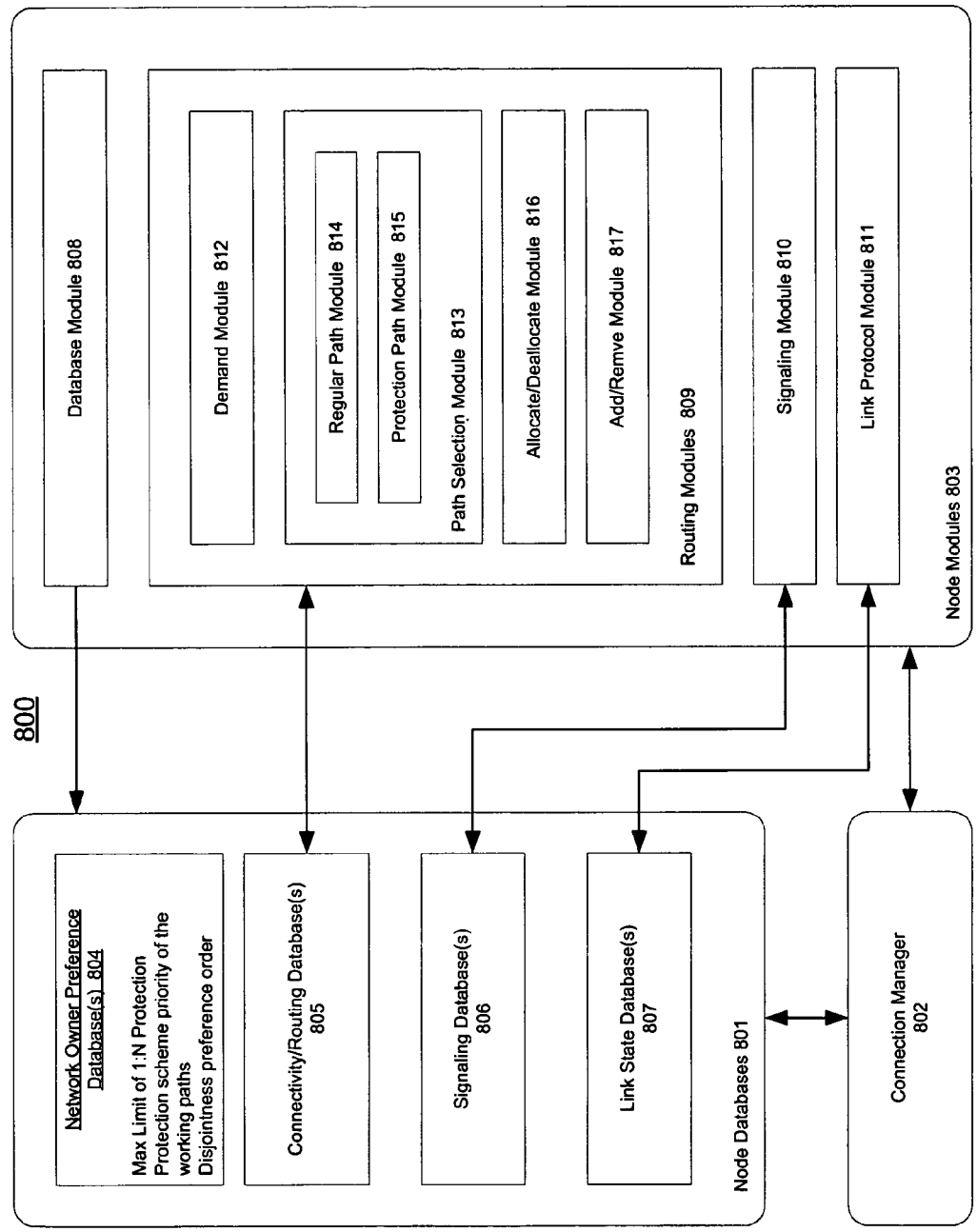
FIG. 8 is a block diagram illustrating an exemplary access node according to certain embodiments of the invention.

FIG. 8 is a block diagram illustrating an exemplary access node according to certain embodiments of the invention. While FIG. 8 illustrates an access node for use in a source based scheme, the invention is not so limited. The exemplary node shown in FIG. 8 may be implemented within a control plane, a data plane, or a combination of both the control and data planes of a node.

In one embodiment, the exemplary node 800 includes, but not limited to, one or more node databases 801, a connection manager 802, and one or more node modules 803. In one embodiment, the node databases 801 include a connectivity database 805 (also referred to as a routing database), a link state database 807, and a network owner preference database 804. The node databases 801 may be implemented as multiple databases linked with each other. Alternatively, databases 801 may be implemented as a centralized database globally managed by, for example, database module 808. In addition, portions or all of the information stored in each database may be duplicated and stored in a local database accessible by one or more modules of the node modules 803. Other configurations apparent to those with ordinary skill in the art may exist.

In one embodiment, the network owner preference database 804 includes a set of information concerning the preferences that a network owner or a service provider may have regarding operations of the network or the respective node. For example, according to one embodiment, the preference database 804 may include, among others, the number of working paths that can share a 1:N protection path. In addition, the preference database 804 may further include the protection scheme priority order that the network owner or the service provider may prefer during an allocation or a contention resolution of a protection path, when a protection path demanded cannot be allocated at a given time.

In one embodiment, the link state database 807 includes a set of one or more link state structures (not shown), one for each link connected to that node. While in certain embodiments these links are discovered through a link management protocol (e.g., a link protocol module), alternative embodiments could use other techniques. In certain embodiments of the invention, each link state structure records a neighboring node, a port through which that neighboring node is connected (fiber links end up at a port on the node), and available wavelengths on that link (through the port).

In one embodiment, the connectivity database 805 includes a set of one or more structures to store the available paths. The connectivity database 805 may also store the configuration of the cross connect of the node. In one embodiment, signaling database 806 includes a set of information, including, but not limited to, the working path and protection path pairs and optionally their respective status.

In one embodiment, the node modules 809 include, but not limited to, a database module 808, a set of one or more routing modules 809, a signaling module 810, and a link protocol module 811. In one embodiment, the routing modules 809 include, but not limited to, a demand module 812, a path selection module 813 (which may include a regular path module 814 and protection path module 815), an allocate/deallocate module 816, and an add/remove module 817. It will be appreciated that other modules, such as, for example, a protection module, etc., may be included.

In one embodiment, the database module 808 builds and maintains one or more databases 801, such as, for example, connectivity database 805. The demand module 812 receives demands for new path/wavelength combinations and invokes the path selection module 813 and allocate module 816 to service the demand.

In one embodiment, the path selection module 870 includes a regular path module 814 and a disjoint path module 815. The path selection module 813 receives requests for paths and the path selection criteria and invokes the appropriate one(s) of the regular path module 814 and disjoint path model 815 for selecting a regular path (e.g., a working path) and/or a protection path respectively.

The allocate module 816 causes the selected path/wavelength combinations to be allocated (e.g., the access node's cross connect and connectivity/routing database 805, as well as, in certain embodiments, communication to other nodes), while the deallocate module causes path/wavelength combinations to be deallocated. The add/remove module 817 addresses additions and removals of channels, links, and nodes in the optical network. The protection module (not shown) is called responsive to the add/remove module 817 to implement a redundancy scheme.

In one embodiment, signaling module 810, among other things, is responsible for signaling the nodes along a path indicating the path is up or down. For example, when a demand for a path is issued, the signaling module 810 receives such a demand. Signaling module 810 may pass the demand to the routing modules 809 to request a working path and optionally a protection path associated with the work path. In response to the demand, the routing modules 809 may, for example, via path selection module 813 and/or allocate module 816, access the connectivity/routing database 805 to select a working path and/or a protection path for the demand. In one embodiment, the demand may include a protection scheme demanded, such as, for example, 1+1, 1:1, 1:N, or reroutable protection scheme. In another embodiment, the demand may further include a priority of a working path demanded if the demand demands for 1:N protection. In an alternative embodiment or where the demand does not include a priority, the priority may be assigned by the node (e.g., signaling module or LMP module), for example, in a first-come-first-serve manner. The routing modules 809 may allocate a working path and a protection path based on this information.

If a protection path demanded cannot be allocated, according to one embodiment, the routing modules 809 may optionally perform contention resolution based on a disjointness preference order and a protection scheme priority order, for example, a lower disjointness, based on a preference order stored in the preference database 804, which may preempt an existing allocated path. The preempted existing path may then be rerouted according to one or more routing policies.

The disjointness preference order and the protection scheme priority order may be set up or specified by an owner of the network.

Thereafter, the routing modules 809 pass the path allocation information to the signaling module 810, which in turn signals the nodes associated with allocated path. Once the nodes of the path have been signaled, the traffic of the path may occur. Once the paths have been allocated and signaled, the routing modules 809 may update the connectivity/routing database 805 reflecting the path allocations, while signaling module 810 may also update the corresponding signaling database 806.

In one embodiment, connection manager 802 is responsible for managing the connections of the node. Connection manager 802 typically communicates with the hardware of the nodes (e.g., physical layers of the network stack or a data plane). Connection manager 802 communicates with node modules 803 and may access one or more databases 801. Communication manager 802 may communicate with the hardware via one or more device drivers of an operating system, such as, for example, Linux or other operating systems.

Figure 9:
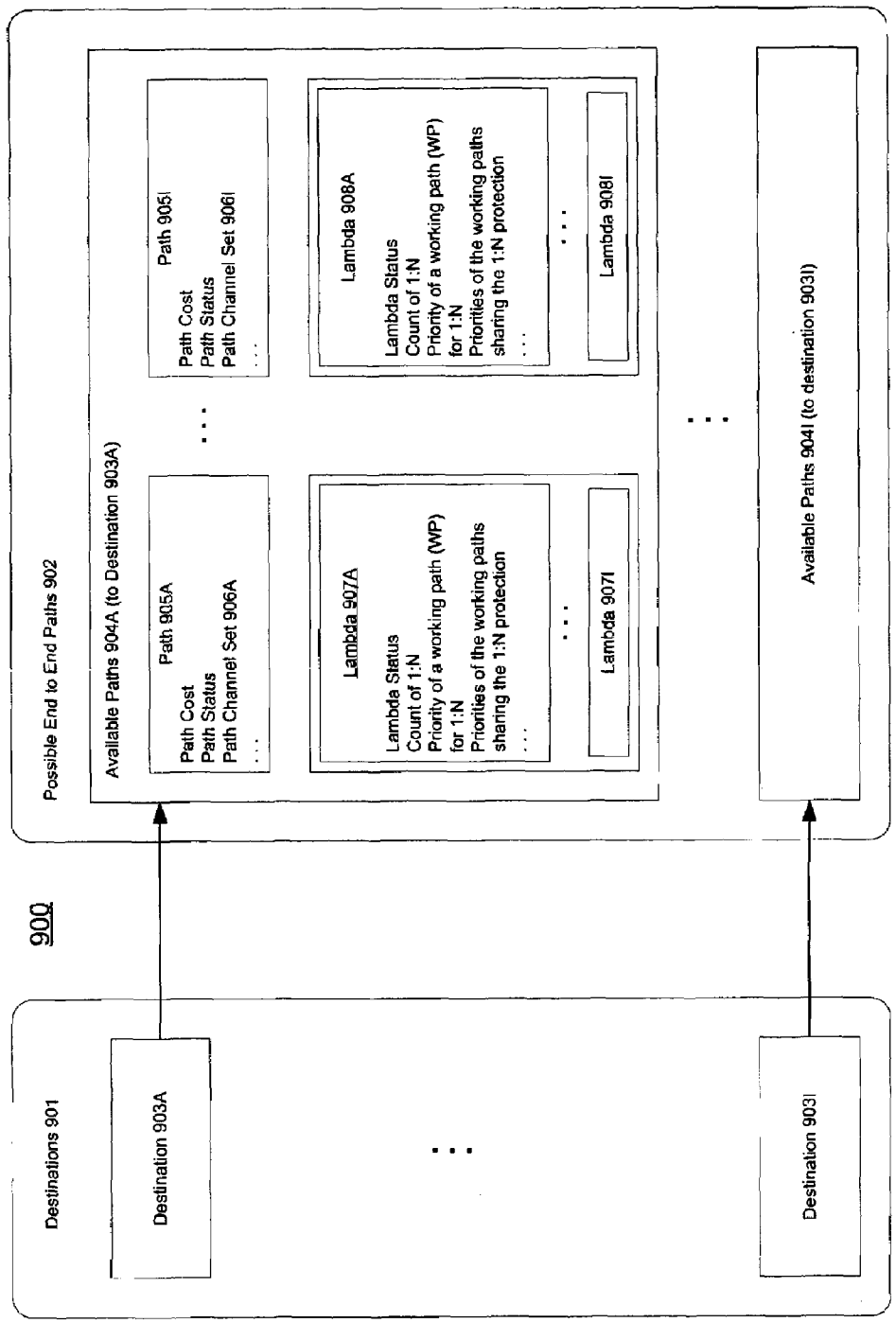
FIG. 9 is a block diagram of an exemplary database organization according to one embodiment of the invention.

FIG. 9 is a block diagram of an exemplary database organization according to one embodiment of the invention. For example, the exemplary database 900 may be implemented as a part of signaling database 806 and/or routing database 805 of FIG. 8. FIG. 9 illustrates a destinations structure 901 and representation of the possible end-to-end paths 902. The destinations structure 901, having entries destination 903A to 903I, is to store each of the reachable destinations in a single entry. Each of the destination entries 903A to 903I is associated with the available paths to that destination 904A to 904I. Specifically, in FIG. 9 the destination 903A has associated to it paths 905A-905I. In other words, the available paths are grouped by common destinations. Each path has associated to it its path channel set; paths 905A-905I respectively have path channel sets 906A-906I. Each of these path channel sets 906A-906I includes a set one or more lambdas (e.g., path channel set 906A includes lambdas 907A-907I; path channel set 906I includes lambdas 908A-908I).

FIG. 9 additionally shows that each path has a path cost and a path status. The path costs are to identify the relative costs of the paths so that they may be distinguished for shortest path purposes. It should be noted that this cost is on a per path basis, as opposed to a per path/wavelength combination basis. The path status identifies the status of the path (e.g., up, down, etc.—where up means that the path is usable and down means that the path is currently not usable (e.g., a path may have a status down if one or more links in the path has been removed).

In addition, each lambda has stored with it a lambda status. The lambda status may not be limited to being allocated or unallocated. For example, a lambda that has failed due to a fiber cut or laser failure could be assigned a status of "broken". For embodiments in which only bi-directional paths can be allocated, the granularity for tracking allocated/unallocated status is simply the lambda level. However, in embodiments that allow for unidirectional path allocation, the granularity of allocated/unallocated status is a status for each direction for each lambda.

Furthermore, in the case for 1:N protection, according to one embodiment, each lambda may also include: 1) for a path/wavelength combination used for a 1:N protection path, the number of the working paths currently sharing the 1:N protection, the priorities of the working paths currently sharing the 1:N protection; and 2) for a path wavelength combination used for a working path, the priority of that working path. An example of the lambda status embodiments is illustrated in FIG. 4.

As a result, based on a given destination, the database can be accessed to locate the available paths to that destination (e.g., the group of paths to select from for allocation can be located). In certain embodiments of the invention, the paths for each destination are also sorted by a set of one or more path characteristics (e.g., any available wavelengths, number of available wavelengths, the cost, load balancing issues, etc.). As a result, depending on the sort, the next path to select for allocation to a given destination will more likely be at the beginning of the group. Once a path is selected, the available wavelengths on that path and their status can be accessed for selection therefrom. In certain embodiments of the invention, the wavelengths of a path channel set are sorted by lambda status so that the next unallocated lambda to select more likely at the beginning of the set.

The exemplary organization of the database in FIG. 9 could be implemented in a variety of ways. For example, the destinations structure 901 could be stored as a separate structure (e.g., a linked list, a tree, etc.), each entry of which includes a pointer to a structure (e.g., a linked list, a tree, etc.) for each group of paths; each entry for the path group structure could include a pointer to a structure (e.g., a linked list, a set, etc.) for the path channel set of that path.

While FIG. 9 illustrates an exemplary database organization, it should be understood that alternative embodiments of the invention could have different organizations and structures. For example, rather than having a separate destinations structure, the paths could be grouped through the sorting of a table having each path as an entry; rather than having a separate lambdas structure for each path, the available lambdas could be stored along with the path. As yet another example, while certain information is stored along with the paths and lambdas (cost and status), alternative embodiments could store more, less, and/or different information.

It should be understood that different embodiments of the invention may rely on different relationships of sorting and searching. For instance, while in certain embodiments the lambdas in the path channel sets are sorted, alternative embodiments of the invention may rely on searching an unsorted path channel set. As another example, while certain embodiments of the invention sort the paths by cost and whether there are any unallocated channels thereon, alternative embodiments of the invention may sort the paths in the groups by cost but not by whether there are any unallocated channels; such embodiments would rely on searching to locate the lowest cost path with an unallocated channel.

Figure 10:
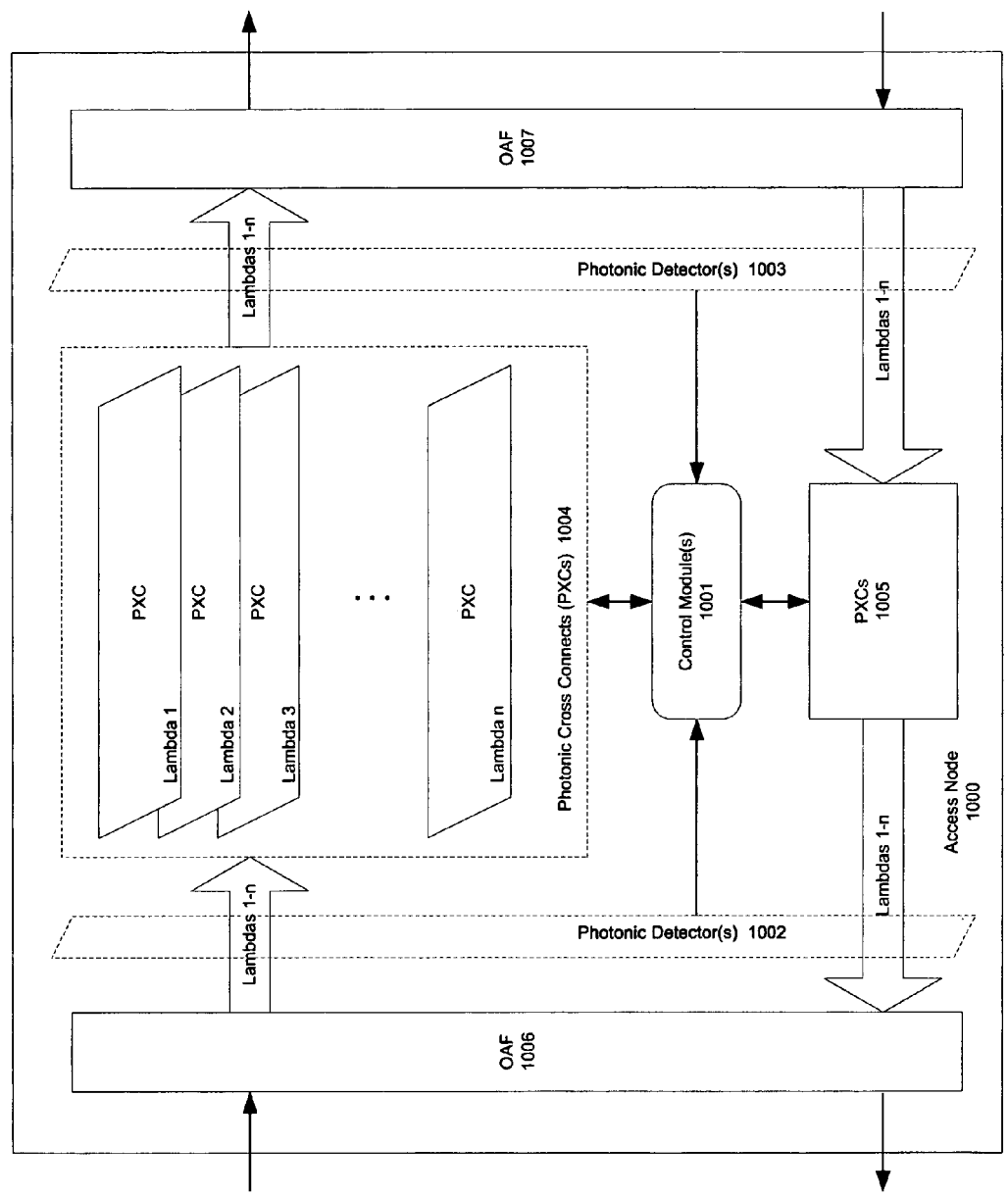
FIG. 10 is a block diagram illustrating an exemplary access node according to one embodiment of the invention.

FIG. 10 is a block diagram illustrating an exemplary access node according to one embodiment of the invention. According to one embodiment, exemplary access node 1000 includes one or more photonic cross connects (PXCs) 1004 and 1005 to provide cross connect services for the unidirectional or bi-directional traffic. Each of the PXCs includes one or more individual PXCs to handle cross connect services for each wavelength (e.g., lambda or channel). In addition, according to one embodiment, exemplary access node includes a control module 1001 coupled to the PXCs 1004 and 1005, and one or more photonic detectors 1002 and 1003. The PXCs 1004 and 1005 may be the same PXCs for handling bi-directional traffic. In addition, the exemplary access node 1000 includes one or more add/drop multiplexers (ADMs) (not shown) to allow traffic get on or off the respective optical circuit.

According to one embodiment, photonic detectors 1002 and 1003 may be implemented within the WSMs and may be used to detect whether there is a LOS on a wavelength. The detection may be performed on a wavelength or channel basis. In one embodiment, the photonic detectors 1002 and 1003 may be photo diodes that can detect presence or absence of the light on a per wavelength basis. When a LOS of a wavelength is detected by the photonic detector, the photonic detector notifies the control module 1001, which may be a part of an OPM.

According to one embodiment, in response to the detection of lost of signals, the control module 1001 sends a message to notify a signaling module (e.g., signaling module 810 of FIG. 8). The signaling module examines the signaling database(s) (e.g., signaling databases 806 of FIG. 8) to determine whether the corresponding access node is a source node of the corresponding optical circuit. If the signaling module determines that the access node is a source of the optical circuit, the signaling module sends a request to a routing module (e.g., routing modules 809) to request for an alternative path for the failed path. In one embodiment, the requested alternative path may be an optical reroutable path.

In response to the request, the routing module allocates based on a routing database (e.g., routing databases 805 of FIG. 8) a reroutable path that satisfies a disjointness constraints with respect to the failed path. Thereafter, the signaling module signals the nodes of the allocated reroutable path and switches the network traffic from the failed path onto the newly allocated reroutable path without waiting for the routing databases to be updated with respect to the failed path.

In addition, if the access node is determined to be a terminating node of an optical circuit, the control module 901 instructs a PXC to turn off a light of a wavelength in an opposite direction of the failed wavelength to notify the other terminating node of the optical circuit failure. Alternatively, the control module 901 may alter the PXC or switch off the laser, etc. for the purposes of signaling.

Figure 11:
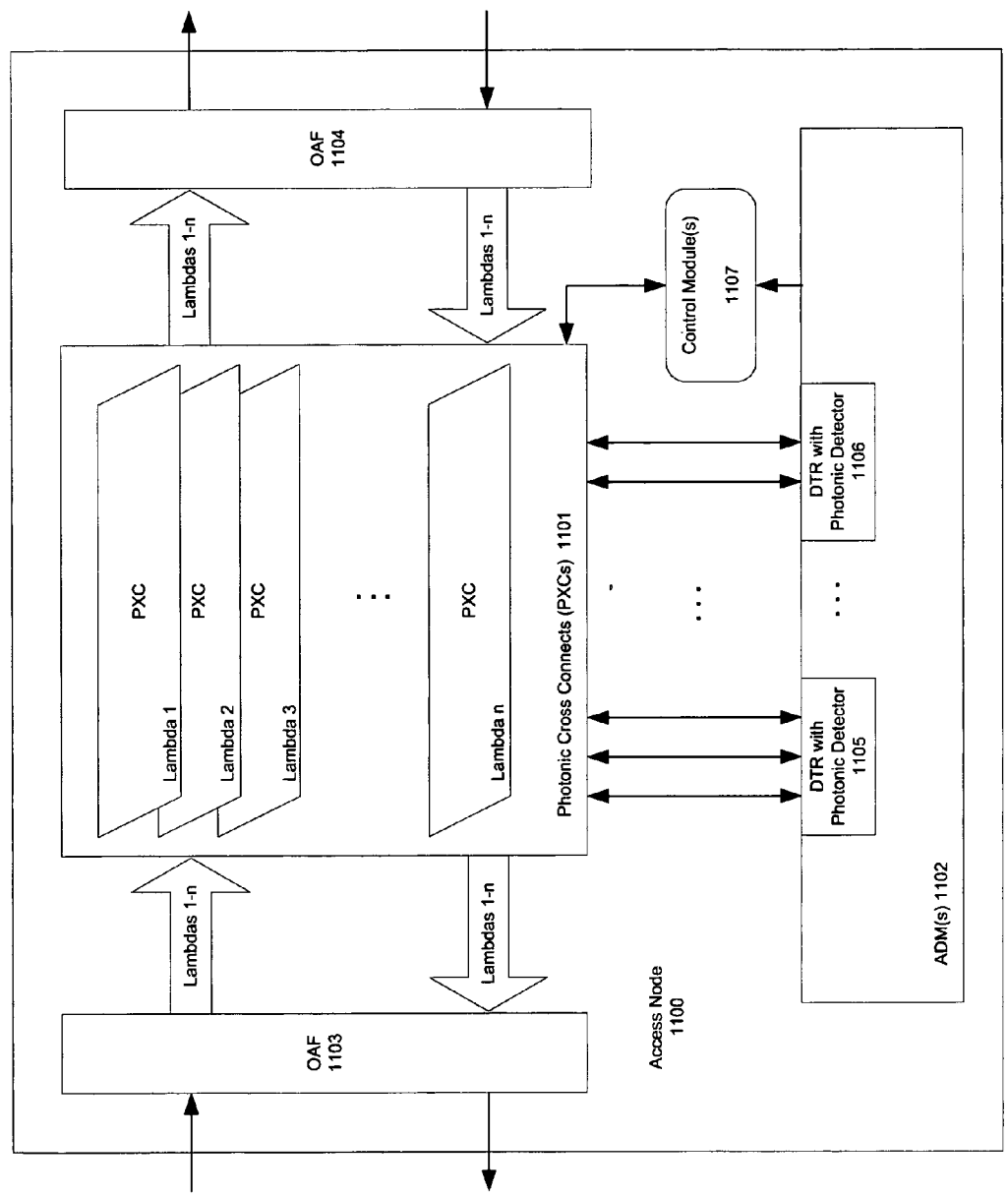
FIG. 11 is a block diagram illustrating an exemplary access node according to another embodiment of the invention.

FIG. 11 is a block diagram illustrating an exemplary access node according to another embodiment of the invention. In this embodiment, the optical signals detected by the photonic detector are the optical signals terminated or originated at a terminating node of an optical circuit. That is, the optical signals of a non-terminating node would not be detected by the photonic detectors because the optical signals are not terminated or originated at a non-terminating node. Therefore, when the phonotic detector, which is located within an ADM, detects a loss of light at one or more path/wavelengths, the corresponding node would most likely a terminating node of the respective optical circuit. As a result, the node may not need to determine whether the corresponding node is a terminating node before responding the detection of the loss of light, because when the control module receives such detection from the photonic detector, the corresponding node would most likely be a terminating node of the optical circuit.

In one embodiment, a photonic detector may be attached to one or more DTRs 1105-1106 within an ADM 1102. Once the photonic detector detects a lost of signals, an interrupt is generated. The interrupt notifies an optical transport channel (OTC) manager (not shown), which may be a part of a control module 1107. In response to the interrupt, the OTC manager sends a message to a signaling module (e.g., signaling module 810 of FIG. 8). The signaling module examines the signaling database(s) (e.g., signaling databases 806 of FIG. 8) to determine whether the corresponding access node is a source node of the corresponding optical circuit. If the signaling module determines that the access node is a source of the optical circuit, the signaling module sends a request to a routing module (e.g., routing modules 809) to request for an alternative path for the failed path. In one embodiment, the requested alternative path may be an optical reroutable path.

In response to the request, the routing module allocates based on a routing database (e.g., routing databases 805 of FIG. 8) a reroutable path that satisfies a set of disjointness constraints with respect to the failed path. Thereafter, the signaling module signals the nodes of the allocated reroutable path and switches the network traffic from the failed path onto the newly allocated reroutable path without waiting for the routing databases to be updated with respect to the failed path.

In addition, if the access node is determined to be a terminating node of an optical circuit, the control module may instruct a PXC 1101 to turn off a light of a wavelength in an opposite direction of the failed wavelength to notify the other terminating node of the optical circuit failure. Alternatively, the control module may alter the PXC or switch off the laser, etc. for the purposes of signaling. Furthermore, the OAFs 1103-1104 may perform shutting off the light of the return path(s).

Figure 12:
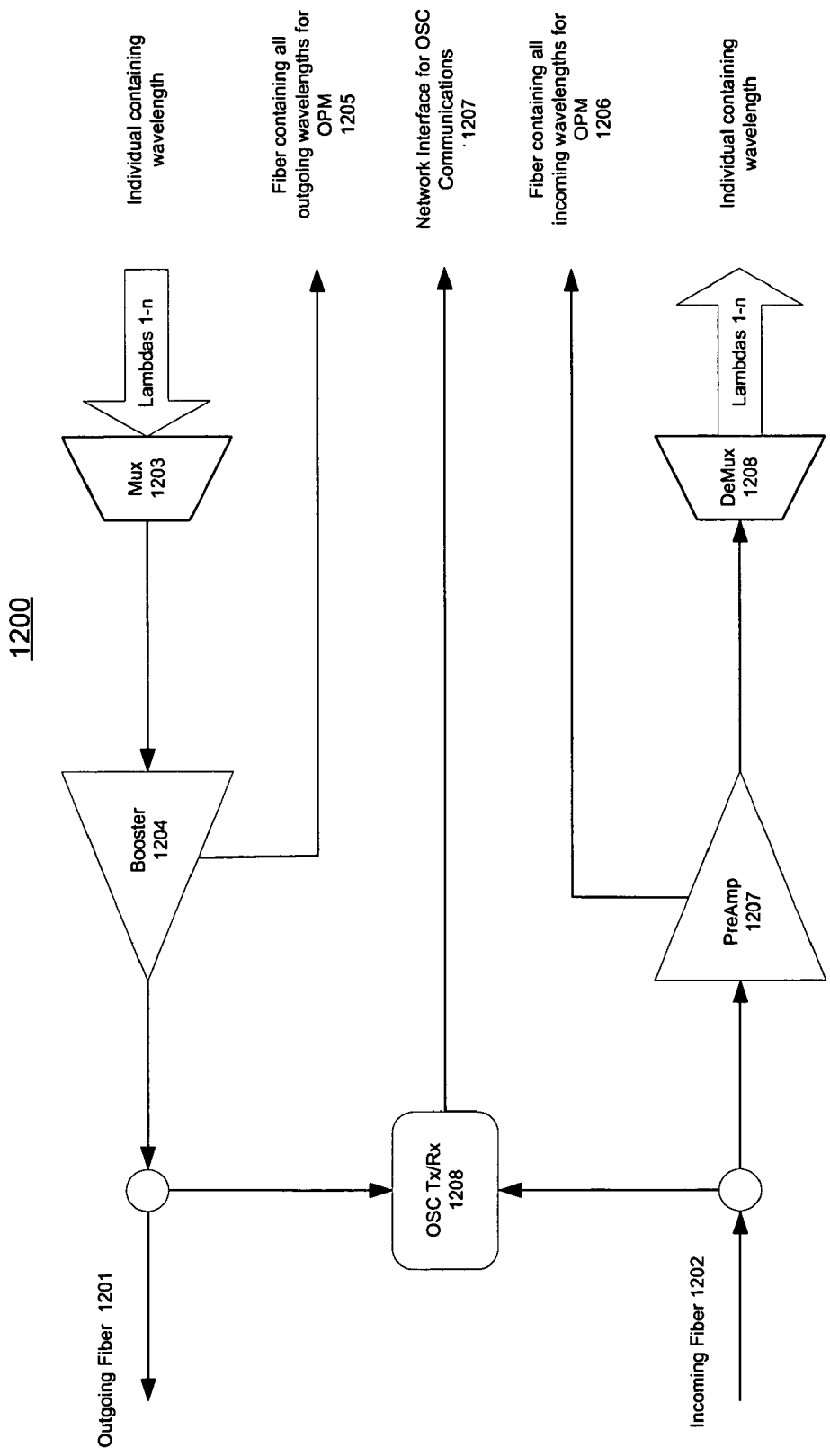
FIG. 12 is a block diagram illustrating an exemplary OAF according to one embodiment of the invention.

According to one embodiment, the LOS may be detected within an OAF of an access node. FIG. 12 is a block diagram illustrating an exemplary OAF according to one embodiment of the invention. For example, exemplary OAF 1200 may be implemented as OAFs 702-703 of FIG. 7, OAFs 1006-1007 of FIG. 10, and/or OAFs 1103-1104 of FIG. 11. According to one embodiment, exemplary OAF 1200 is responsible for all the DWDM multiplexing aspects of a particular network fiber.

In an incoming direction 1202, according to one embodiment, OAF pre-amplifier 1207 pre-amplifies the incoming multiplexed optical signal and fixes pulse distortion due to chromatic dispersion. The multiplxed optical signal are then de-multiplexed by the de-multiplexer 1208 into individual wavelengths (channels or lambda).

According to one embodiment, one of the purposes of the pre-amplifier 1207 is to compensate for the fiber loss. Since the distance to the upstream node will vary from installation to installation, this amplifier must automatically adjust its gain. In addition, according to one embodiment, the amplifier 1207 provides an optical tap 1206 that allows the optical signal to be monitored unobtrusively. The tapped signal is sent to the OPM module for analysis.

In an outgoing direction 1201, according to one embodiment, multiplexer 1203 combines the individual channels into a multiplexed optical signal. The booster 1204 boosts the multiplexed optical signal prior to sending to the next node. Similarly, booster 1204 is to compensate for the loss within the system itself. In addition, there is another optical tap 1205 that allows the output from the booster amplifier 1204 to be sent to the OPM.

According to one embodiment, an optical supervisory channel (OSC) 1208 is used to convey signaling and other overhead information between nodes without the need for an external IP network. This signal is outside the gain bandwidth of the optical amplifier and may be tapped off before amplification by one or more OSC/C-band filters (not shown).

The OSC 1208 can be used to provide a variety of functions, including:

- The presence of this signal provides an indication that the fiber is intact and the upstream node is working properly.
- Component in automatic link detection and discovery (e.g. LMP).
- Initiator to power up the optical amps in the OAF after a signal interruption (see below).
- Mechanism to rapidly multi-cast alarm information.
- Mechanism to transport signaling information.

The OSC 1208 may also be used as a management interface, such as, for example, SNMP, telnet, FTP, etc.

According to one embodiment, one or more photonic detectors may be attached to one or more of taps 1205-1207 to detect the LOS. Such detection may be performed on a per link basis (e.g., whether there is light on the fiber). Alternatively, the tapped signal may be further analyzed to determine which of the channels (e.g., wavelengths or lambdas) fails.

In a particular embodiment, when the OPM determines that a LOS is detected based on the tapped signals via taps 1205 and 1206, the OPM sends a message to a signaling module indicating which port having LOS. The signaling module determines which channel or channels on that port have LOS. The signaling module further determines which path or paths are affected. In response, the signaling module sends a request to a routing module to allocate another reroutable path that satisfies a set of disjointness constraints with respect to the determined failed path or paths. Once the new path is allocated and signaled successfully, the signaling module switches the network traffic over to the new reroutable path. According to one embodiment, the OSC performs similar operations.

Figure 13:
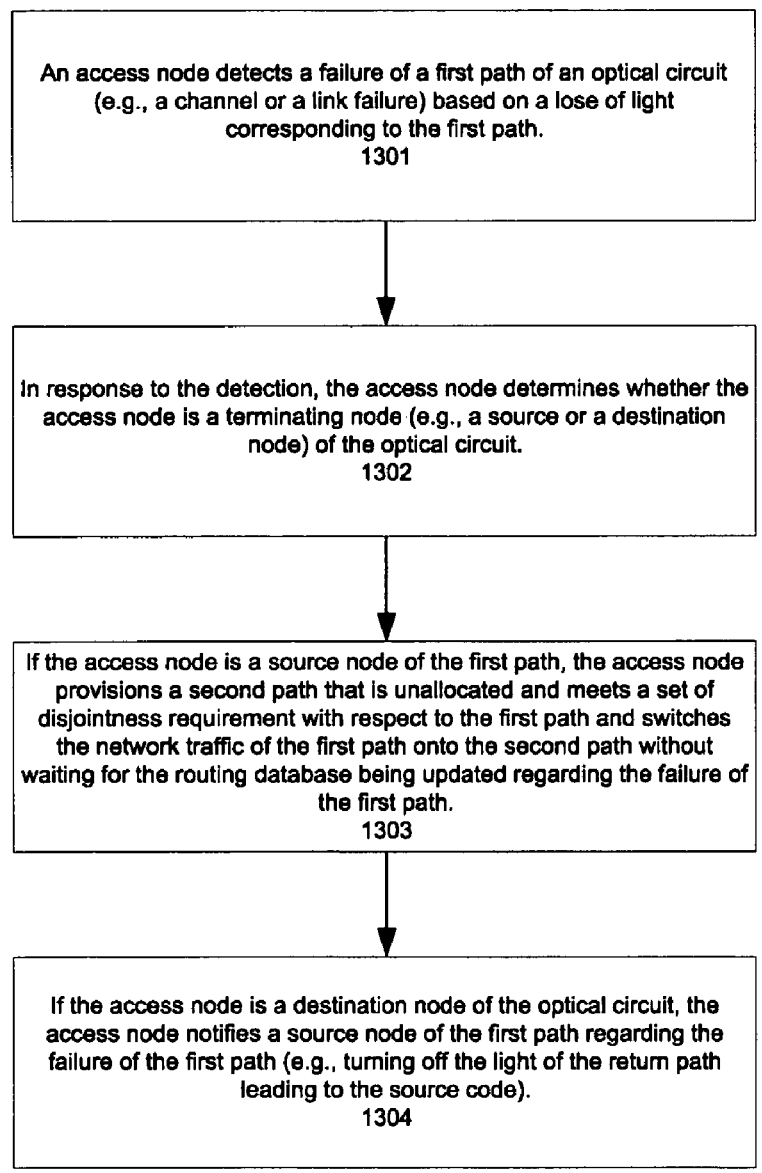
FIG. 13 is a flow diagram illustrating an exemplary process for rerouting network traffic according to one embodiment of the invention.

FIG. 13 is a flow diagram illustrating an exemplary process for rerouting network traffic according to one embodiment of the invention. Exemplary process 1300 may be performed by a processing logic that may comprise hardware (circuitry, dedicated logic, etc.), software (such as is run on a dedicated machine), or a combination of both. In one embodiment, exemplary process 1300 includes, but not limited to, detecting at an access node that at least a portion of a first path of an optical circuit fails based on a loss of a light of the at least a portion of the first path, and in response to the detection, the access node provisioning a second path leading to a destination node of the first path without waiting for an update of a routing database regarding the failure of the first path, the second path satisfying a set of disjointness requirements with respect to the first path.

Referring to FIG. 13, at block 1301, an access node of an optical circuit detects a failure of a first path based on a loss of light corresponding to the first path. The loss of light may be detected on a per channel basis (e.g., a malfunction laser) or a per link basis (e.g., a fiber cut). The detection may be performed via one or more photonic detectors disposed at a variety of locations within the access node such as those described above. In response to the detection, at block 1302, the access node determines whether the access node is a terminating node (e.g., a source or a destination node) of the optical circuit. In one embodiment, the determination is performed by a signaling module, for example, using a signaling database and/or routing database.

If the access node is a source node of the first path, at block 1303, the access node provision a second path that is unallocated and satisfies a set of disjointness constraints with respect to the first path. Thereafter, the network traffic is switched from the first path to the second path. In one embodiment, the signaling module requests a routing module to allocate another path as the second path that leads to the same destination and satisfies the set of disjointness constraints against the first path. In one embodiment, the network traffic is switched over to the second path without waiting for the databases (e.g., signaling and/or routing databases) being updated. If the access node is a destination of the optical circuit, at block 1304, the access node may notifies the corresponding source node of the first path regarding the failure of the first path. In one embodiment, the notification is performed by turning off the light of the corresponding return path leading to the source node. Other operations may also be performed.

Thus, reroutable protection schemes of an optical network have been described herein. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed by a node of a wavelength multiplex optical network, the method comprising:
    detecting at an access node that at least a portion of a first path of an optical circuit fails based on a loss of a light of the at least a portion of the first path;
    in response to the detection, determining whether the access node is a source node of the optical circuit in response to the detection; and
    if the access node is the source node of the optical circuit, the access node provisioning a second path leading to a destination node of the first path without waiting for an update of a routing database regarding the failure of the first path, the routing database storing available paths from a source node to reachable destination nodes in the optical network, wherein the routing database is subsequently updated to indicating a failure of the first path;
    if the access node is not a source node, determining whether the access node is a destination node of the optical circuit; and
    notifying the source node of the optical circuit by turning off a light of a returning path leading to the source node of the optical circuit, if the access node is the destination node of the optical circuit,
    wherein the second path satisfies a predetermined set of disjointness requirements with respect to the first path, the predetermined set of disjointness requirements including at least one of a node disjoint, a link disjoint, a maximally node disjoint, and a maximally link disjoint requirements.

2. The method of claim 1, wherein the provisioning is performed only if the access node is the source node of the optical circuit.

3. The method of claim 2, further comprising:
    signaling one or more nodes of the second path regarding status of the second path if the access node is the source node of the optical circuit; and
    switching network traffic from the first path over to the second path.

4. The method of claim 2, wherein the first path comprises a plurality of wavelengths, and wherein the at least a portion of the first path includes one or more of the plurality of wavelengths.

5. The method of claim 4, further comprising determining which of the plurality of wavelengths of the first path is down, wherein the second path includes one or more path and wavelength combinations leading to one or more destinations of the failed path and wavelength combinations.

6. The method of claim 1, wherein the second path is an unallocated path leading to the destination of the optical circuit.

7. The method of claim 1, wherein the detection is performed via one or more photonic detectors attached to the first path within the access node.

8. The method of claim 7, wherein at least one photonic detector is located within a photonic crossconnect of the access node.

9. The method of claim 7, wherein at least one photonic detector is located within an add and drop multiplexer of the access node.

10. The method of claim 7, wherein at least one photonic detector is attached to an amplifier on one of an ingress and an egress ports of the access node.

11. An apparatus, comprising;
an access node to be coupled to a wavelength division multiplex optical network, the access node including,
a detection module to detect that at least a portion of a first path of an optical circuit fails based on a loss of a light of the at least a portion of the first path,
a signaling module to determine whether the access node is a source node of the optical circuit in response to the detection, to determine whether the access node is a destination node of the optical circuit if the access node is not a source node of the optical circuit and to notify the source node of the optical circuit by turning off a light of a returning path leading to the source node of the optical circuit, if the access node is the destination node of the optical circuit;
a routing database to store available paths from a source node to reachable destination nodes in the optical network; and
a routing module to provision a second path leading to a destination node of the first path without waiting for an update of a routing database regarding the failure of the first path in response to the detection if the access node is the source node of the optical circuit, wherein the routing database is subsequently updated to indicating a failure of the first path, and
wherein the second path satisfies a predetermined set of disjointness requirements with respect to the first path, the predetermined set of disjointness requirements including at least one of a node disjoint, a link disjoint, a maximally node disjoint, and a maximally link disjoint requirements.

12. The apparatus of claim 11, wherein the signaling module is to:
signal one or more nodes of the second path regarding status of the second path; and
switch network traffic from the first path over to the second path if the access node is the source node of the optical circuit.

13. The apparatus of claim 11, wherein the first path comprises a plurality of wavelengths, and wherein the at least a portion of the first path includes one or more of the plurality of wavelengths.

14. The apparatus of claim 13, wherein the signaling module determines which of the plurality of wavelengths of the first path is down, wherein the second path includes one or more path and wavelength combinations leading to one or more destinations of the failed path and wavelength combinations.

15. The apparatus of claim 11, wherein the second path is an unallocated path leading to the destination of the optical circuit.

16. A wavelength multiplex optical network, comprising:
a plurality of nodes interconnected via one or more links, each of the plurality of nodes including
a detection module to detect that at least a portion of a first path of an optical circuit fails based on a loss of a light of the at least a portion of the first path,
a signaling module to determine whether that node is a source node of the optical circuit in response to the detection, to determine whether that node is a destination node of the optical circuit if that node is not a source node of the optical circuit, and to notify the source node of the optical circuit by turning off a light of a returning path leading to the source node of the optical circuit, if that node is the destination node of the optical circuit;
a routing database to store available paths from a source node to reachable destination nodes in the optical network; and
a routing module to provision a second path leading to a destination node of the first path without waiting for an update of a routing database regarding the failure of the first path in response to the detection if that node is the source node of the optical circuit, wherein the routing database is subsequently updated to indicating a failure of the first path, and
wherein the second path satisfies a predetermined set of disjointness requirements with respect to the first path, the predetermined set of disjointness requirements including at least one of a node disjoint, a link disjoint, a maximally node disjoint, and a maximally link disjoint requirements.

17. The optical network of claim 16, wherein the signaling module is to:
signal one or more other nodes of the second path regarding status of the second path if that node is the source node of the optical circuit; and
switch network traffic from the first path over to the second path.

18. The optical network of claim 16, wherein the first path comprises a plurality of wavelengths, and wherein the at least a portion of the first path includes one or more of the plurality of wavelengths.

19. The optical network of claim 18, wherein the signaling module determines which of the plurality of wavelengths of the first path is down, wherein the second path includes one or more path and wavelength combinations leading to one or more destinations of the failed path and wavelength combinations.

20. The optical network of claim 16, wherein the second path is an unallocated path leading to the destination of the optical circuit.

21. An apparatus, comprising:
an access node to be coupled to a wavelength division multiplex optical network, the access node including,
a detection module to detect that at least a portion of a first path of an optical circuit fails based on a loss of a light of the at least a portion of the first path,
a signaling module to determine whether the access node is a source node of the optical circuit in response to the detection;
a routing database to store available paths from a source node to reachable destination nodes in the optical network; and
a routing module to provision a second path leading to a destination node of the first path without waiting for an update of a routing database regarding the failure of the first path in response to the detection if the access node is the source node of the optical circuit, wherein the routing database is subsequently updated to indicating a failure of the first path,
wherein the second path satisfies a predetermined set of disjointness requirements with respect to the first path, the predetermined set of disjointness requirements including at least one of a node disjoint, a link disjoint, a maximally node disjoint, and a maximally link disjoint requirements, and
wherein the detection module comprises one or more photonic detectors to detect the failure of the first path by detecting lost of light from a return path corresponding to the first path, wherein the lost of light is caused by turning off a light of the return path by a destination node of the first path in response to failure of the first path.

22. The apparatus of claim 21, wherein the access node further comprises one or more photonic crossconnects, and wherein at least one photonic detector is located within one of the photonic crossconnects.

23. The apparatus of claim 21, wherein the access node further comprises one or more add and drop multiplexers (ADMs), and wherein at least one photonic detector is located within one of the ADMs.

24. The apparatus of claim 21, wherein the access node comprises an ingress amplifier and an egress amplifier, and wherein at least one photonic detector is attached to at least one of the ingress and egress amplifiers.

25. A wavelength multiplex optical network, comprising:
a plurality of nodes interconnected via one or more links, each of the plurality of nodes including
   a detection module to detect that at least a portion of a first path of an optical circuit fails based on a loss of a light of the at least a portion of the first path,
   a signaling module to determine whether that node is a source node of the optical circuit in response to the detection,
   a routing database to store available paths from a source node to reachable destination nodes in the optical network, and
   a routing module to provision a second path leading to a destination node of the first path without waiting for an update of a routing database regarding the failure of the first path in response to the detection if that node is the source node of the optical circuit, wherein the routing database is subsequently updated to indicating a failure of the first path,
wherein the second path satisfies a predetermined set of disjointness requirements with respect to the first path, the predetermined set of disjointness requirements including at least one of a node disjoint, a link disjoint, a maximally node disjoint, and a maximally link disjoint requirements, and
wherein the detection module comprises one or more photonic detectors to detect the failure of the first path by detecting lost of light from a return path corresponding to the first path, wherein the lost of light is caused by turning off a light of the return path by a destination node of the first path in response to failure of the first path.

26. The optical network of claim 25, wherein that node further comprises one or more photonic crossconnects, and wherein at least one photonic detector is located within one of the photonic crossconnects.

27. The optical network of claim 25, wherein that node further comprises one or more add and drop multiplexers (ADMs), and wherein at least one photonic detector is located within one of the ADMs.

28. The optical network of claim 25, wherein that node comprises an ingress amplifier and an egress amplifier, and wherein at least one photonic detector is attached to at least one of the ingress and egress amplifiers.

* * * * *